(12) United States Patent
Alexandridis et al.

(10) Patent No.: US 7,718,094 B2
(45) Date of Patent: May 18, 2010

(54) PREPARATION OF METALLIC NANOPARTICLES

(75) Inventors: Paschalis Alexandridis, East Amherst, NY (US); Toshio Sakai, Tonawanda, NY (US)

(73) Assignee: The Research Foundation of State University of New York, Amherst, NY (US)

( * ) Notice: Subject to any disclaimer, the term of this patent is extended or adjusted under 35 U.S.C. 154(b) by 1222 days.

(21) Appl. No.: 11/156,446

(22) Filed: Jun. 20, 2005

(65) Prior Publication Data
US 2006/0235087 A1 Oct. 19, 2006

Related U.S. Application Data

(60) Provisional application No. 60/580,768, filed on Jun. 18, 2004.

(51) Int. Cl.
*H01B 1/22* (2006.01)
*B01F 3/12* (2006.01)
*B22F 9/24* (2006.01)
*B01J 3/00* (2006.01)
*B01F 1/00* (2006.01)

(52) U.S. Cl. .................. 252/514; 252/500; 252/512; 516/97; 427/213.3; 427/217; 75/343; 977/777

(58) Field of Classification Search ............... 516/97; 252/514, 500, 512; 75/343; 977/777; 427/213.3, 427/217

See application file for complete search history.

(56) References Cited

U.S. PATENT DOCUMENTS

| | | | | |
|---|---|---|---|---|
| 3,639,575 | A * | 2/1972 | Schmolka | 424/618 |
| 4,983,509 | A * | 1/1991 | Inoue et al. | 430/627 |
| 7,122,133 | B2 | 10/2006 | Kataoka et al. | 252/514 |
| 7,135,055 | B2 * | 11/2006 | Mirkin et al. | 75/343 |
| 7,147,687 | B2 * | 12/2006 | Mirkin et al. | 75/343 |
| 7,238,472 | B2 * | 7/2007 | Mirkin et al. | 435/6 |
| 2002/0177143 | A1 * | 11/2002 | Mirkin et al. | 435/6 |

FOREIGN PATENT DOCUMENTS

WO  WO 0220200 A1 * 3/2002

OTHER PUBLICATIONS

Murray, C. B.; Kagan, C. R.; Bawendi, M. G. *Annu. Rev. Mater. Sci.* 2000, 30545-610.
Busbee, B. D.; Obare, S. O.; Murphy, C. J. *Adv. Mater.* 2003, 15414-416.
Link, S.; El-Sayed, M. A. *J. Phys. Chem. B* 1999, 103(40), 8410-8426.
Sun, Y. G.; Xia, Y. N. *Science* 2002, 2982176-2179.
Pinna, N.; Weiss, K.; Urban, J.; Pileni, M.-P. *Adv. Mater.* 2001, 13261-264.
Kooij, F. M. V. d.; Kassapidou, K.; Lekkerkerker, H. N. W. *Nature* 2000, 406868-871.
Manna, L.; Milliron, D. J.; Meisel, A.; Scher, E. C.; Alivisatos, A. P. *Nat. Mater.* 2003, 2382.
Jin, R. C.; Cao, Y. W.; Mirkin, C. A.; Kelly, K. L.; Schatz, G. C.; Zheng, J. G. *Science* 2001, 2941901-1903.
Wilcoxon, J. P.; Martin, J. E.; Parsapour, F.; Wiedenman, B.; Kelley D. F. *J. Chem. Phys.* 1998, 108(21), 9137-9143.
Steigerwald, M. L.; Alivisatos, A. P.; Gibson, J. M.; Harris, T. D.; Kortan, R.; Muller, A. J.; Thayer, A. M.; Duncan, T. M.; Douglass, D. C.; Brus, L. E. *J. Am. Chem. Soc.* 1988, 110(10), 3046-3050.
Spanhel, L.; Haase, M.; Weller, H.; Jenglein, A. *J. Am. Chem. Soc.* 1987, 109(19), 5649-5655.
Brugger, P. A.; Cuender, P.; Gratzel, M. J. *J. Am. Chem. Soc.* 1981, 103(11), 2923-2927.
Mulvaney, P.; Linnert, T.; Henglein, A. *J. Phys. Chem.* 1991, 95(20), 7843-7846.
Haruta, M. *Cattech* 2002, 6(3), 102-115.
Ahmadi, T. S.; Wang, Z. L.; Green, T. C.; Henglein, A.; El-Sayed, M. A. *Science* 1996, 272(5270), 1924-1926.
Pileni, M. P. *Langmuir* 1997, 13(13), 3266-3276.
Raveendran, P.; Fu, J.; Wallen, S. L. *J. Am. Chem. Soc.* 2003,125(46), 13940-13941.
Chen, F.; Xu, G.-Q.; Hor, T. S. A. *Materials Letters* 2003, 573282-3286, ( Jul. 2003).
Zhang, R.; Liu, J.; He, J.; Liu, Z.; Zhang, J. *Langmuir* 2003, 19(21), 8611-8614.
Mandal, M.; Ghosh, S. K.; Kundu, S.; Esumi, K.; Pal, T. *Langmuir* 2002, 18(21), 7792-7797.
Caruso, R. A.; Ashokkumar, M.; Grieser, F. *Langmuir* 2002, 18(21), 7831-7836.
Longenberger, L.; Mills, G. *J. Phys. Chem.* 1995, 99(2), 475-478.
Sun, X.; Jiang, X.; Dong, S.; Wang, E. *Macromol. Rapid Commun.* 2003, 24(17), 1024-1028.
Ishii, T.; Otsuka, H.; Kataoka, K.; Nagasaki, Y. *Langmuir* 2004, 20(3), 561-564.
Zhang, L.; Yu, J. C.; Yip, H. Y.; Li, Q.; Kwong, K. W.; Xu, A.-W.; Wong, P. K. *Langmuir* 2003, 19(24), 10372-10380.
Kim, J.-U.; Cha, S.-H.; Shin, K.; Jho, J. Y.; Lee, J.-C. *Adv. Mater.* 2004, 16(5), 459-464.
Sakai, T.; Alexandridis, P. *Langmuir* 2004, 20(20), 8426-8430.
Sakai, T.; Alexandridis, P. *J. Phys. Chem. B* 2005, 109(16), 7766-7777.

(Continued)

*Primary Examiner*—Daniel S Metzmaier
(74) *Attorney, Agent, or Firm*—Hodgson Russ LLP

(57) ABSTRACT

A method for the formation of metallic nanoparticles, such as gold and silver nanoparticles, which involves, combining in a single solution, solvent, metal ions and copolymers under conditions such that metal nanoparticles are formed. The copolymers have both reducing components and stabilizing components. The method can be used to form metal nanoparticles having a desired shape and size.

6 Claims, 24 Drawing Sheets

OTHER PUBLICATIONS

Sakai, T.; Alexandridis, P. *Nanotechnology* 2005, 16(7), S344-S353.
Sakai, T.; Alexandridis, P. *Polym. Mater. Sci. Eng.* 2004, 91, 939-940.
Iwamoto, M.; Kuroba, K.; Zaporojtchenko, V.; Hayashi, S.; Faupel, F. *Eur. Phys. J. D* 2003, 24(1-3), 365-367.

Bronstein, L.; Antonietti, M.; Valetsky, P.; Metal Colloids in Block Copolymer Micelles; Formation and Material Properties; *Nanoparticles and Nanostructured Films*; Fendler, J. H., Ed.; Wiley-VCH: Weinheim, 1998; pp. 145-172.

* cited by examiner

PREPARATION OF METALLIC NANOPARTICLES

CROSS-REFERENCE TO RELATED APPLICATION

This application claims priority to U.S. provisional application No. 60/580,768, filed on Jun. 18, 2004, the disclosure of which is hereby incorporated by reference.

BACKGROUND

Metal nanoparticles such as nanospheres(1), nanorods(2, 3), nanocubes(4), nanoplates(5, 6), nanotetrapods(7), and nanoprisms(8) are attracting significant attention because of their size-dependent optical, magnetic, electronic and catalytic properties.(9-14) As but one example, gold nanoparticles can exhibit intense photoluminescence, a phenomenon which is expected to find wide scientific and practical use.(9)

The development of simple and versatile methods for the preparation of nanoparticles in a size or shape-selected and -controlled manner is an important and challenging task. (1-8, 15, 16) In addition, utilization of non-toxic chemicals, environmentally benign solvents, and renewable materials are emerging issues that merit important consideration in a synthetic strategy.(17)

Presently, the preparation of metal nanoparticles in solution most commonly involves chemical reduction of metal ions. In organic solvents, surfactant-stabilized reverse micellar ("water-in-oil") systems have been used as "nanoreactors" for the chemical reduction of metal ions.(16, 18-20) In aqueous solutions(17, 21-27), metal nanoparticles have been typically produced from chemical reduction of metal ions by reducing agents dissolved in water; such reduction takes place in the presence of water-soluble polymers or surfactants and with the aid of externally supplied energy such as heat (17), photo-irradiation,(21) or ultrasound-irradiation(22). Such methods allow for some degree of control over the size and concentration of the dispersed particles.(21, 22, 26, 27)

However, concerns and problems remain. Present methods use organic solvents, produce byproducts due to the reducing agent, involve multiple steps, or require high concentration of protective agent to attain colloidal stability of the nanoparticles.(23) In an aim to address some of these problems, single-step synthesis of gold nanoparticles in aqueous solutions has been reported using poly(ethylene oxide)(24), diamine terminated poly(ethylene oxide)(25), amine-functionalized third-generation poly(propyleneimine) dendrimers(26) or α-biotinyl-PEG-block-[poly(2-(N,N-dimethylamino)ethyl methacrylate)](27). However, these recently-reported single-step methods may require utilization of "exotic" polymers, high temperatures(25-27) and high concentrations of protective agent.

Metal nanoparticle synthesis has been achieved by the use of a poly(ethylene oxide)-poly(propylene oxide) (PEO-PPO) type amphiphilic block copolymer(28, 29) In particular, silver nanoparticles are synthesized by mixing of $[Ag(NH_3)_2]^+$ aqueous solution with PEO-PPO-PEO block copolymer (Pluronic P123) ethanol solution under ambient light at room temperature.(28) Gold nanowires and nanosheets are synthesized by UV irradiation photoreduction and thermal reduction processes in bulk copolymer (Pluronic P123).(29) However, these methods require the cumbersome use and removal of a cosolvent (tetrahydrofuran), the formation of a polymer film rather than a solution, and the application of an external energy source. Furthermore, no methods for the control particle formation, particle size and shape are disclosed.

SUMMARY OF THE INVENTION

We have found a simple, single-step method for the preparation of metal nanoparticles in solutions containing metal ions and PEO-PPO type amphiphilic block copolymers.(30-33) In addition, we found that colloidal suspensions of nanoparticles and other structures, such as rods and nanowires, can be selectively formed in predetermined sizes in a single step, without the application of external energy sources and without cumbersome preparation steps such as cosolvent removal. (30-33) Provided are metallic nanoparticles, including rods and nanowires, suspensions containing them, and methods for the preparation of the nanoparticles and the suspensions. The method of suspension preparation comprises forming a solution which contains a solvent, metal ions, and a copolymer, the solution parameters such as temperature, metal ion concentration, solvent and copolymer being selected such that a suspension of metal nanoparticles having a desired shape and size are formed.

DETAILED DESCRIPTION OF THE INVENTION

Figure 1:
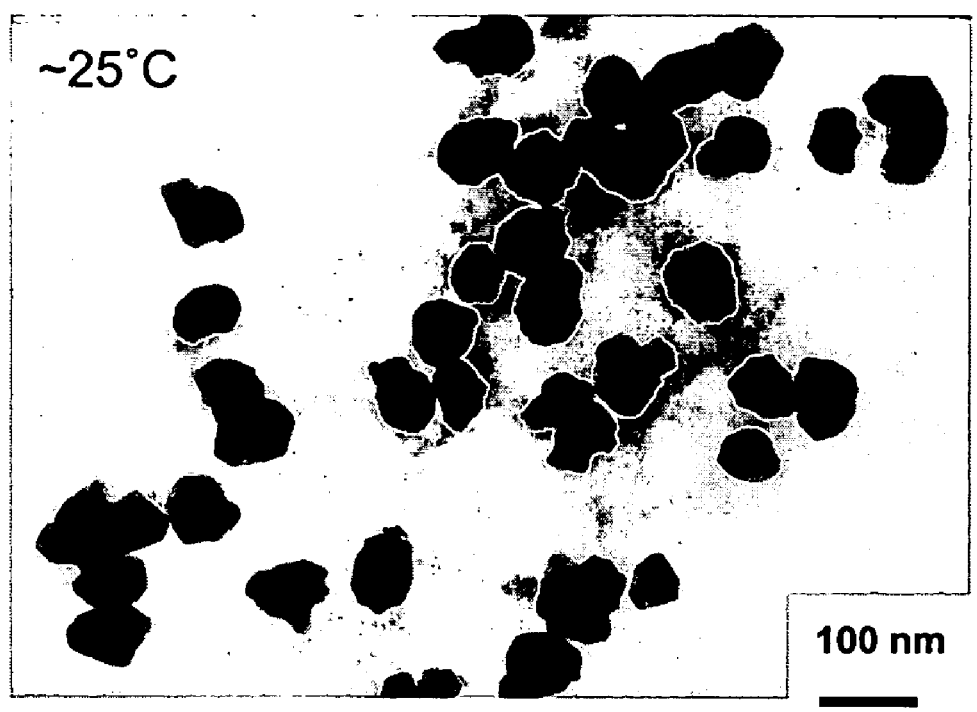
FIG. 1. TEM images of gold particles synthesized in 10 wt % $EO_{37}PO_{56}EO_{37}$ formamide solutions at ambient conditions (~25° C.) for 2 days (upper image) and at ~100° C. for 30 min (bottom image). The scale bar represents 100 nm.
Figure 1:
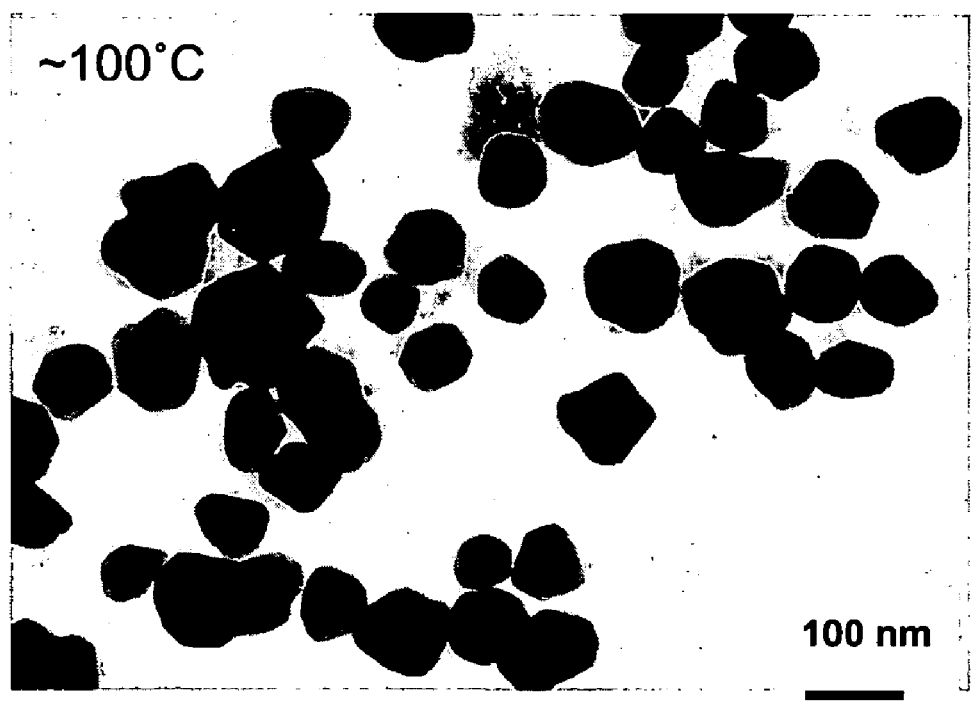

In metal nanoparticle synthesis in solutions, copolymers are used to reduce metal ions to metal particles to create stable particle dispersions. A copolymer is used which comprises a first polymer and a second polymer which are joined to form a single polymer. The first polymer is characterized as having a greater reducing activity than the second polymer and the second polymer is characterized as having a greater colloidal stabilizing activity than the first polymer. Metal ion reduction is facilitated by complexation, thought to be promoted by ion-dipole interactions, of metal ions with the block copolymers. Colloidal stabilization is, at least in part, due to polymer adsorption on the surface of particles.

The present invention provides a process for the fabrication of nanoparticles having three dimensional shapes which can be chosen by selection of particle formation solution parameters, especially copolymer structure and concentration. Particles which are fabricated according to the process can have shapes which include spherical and polyhedral. The nanoparticles can also be shaped as triangular and hexagonal plates and rods, as well as nanowires. The term "nanoparticles" refers to particles having dimensions in the range of from 0.001 to 2 microns, or to rods having a short dimension in the foregoing range. The term "nanoparticle" as used herein also includes nanowires. The term "nanowire" refers to wire-like structure having a short dimension in the forgoing range and a length in the range of from 0.01 to 10 microns.

"Polymer" is a general term, which comprises chain of one monomer species or more monomer species such as ethylene oxide) (EO), vinyl alcohol (VA), vinyl pyrolidone (VP), propylene oxide (PO), butylene oxide (BO), styrene.

A "copolymer" is generally understood in the art to mean a polymer having relatively small molecular weight (i.e., the number of segments is relatively small.

A "block copolymer" comprises two or more different copolymers ("blocks"). The joining of these blocks gives a block copolymer, for example, A-B-A, B-A-B, A-B-C and A-C-B which are triblock copolymers, A-B is a diblock copolymer, if a block was represented as A, B or C. Architecture and sequence of these blocks determines the structure of block copolymers such as diblock (e.g., A-B, A-C) copolymers, triblock (e.g, A-B-A, B-A-B, A-B-C, A-C-B) copolymers, random (e.g., A-B-B-A-A-B-C-C) block copolymers, or star block copolymers (non-linear structure, several blocks bind at one points).

For example, when blocks are poly(ethylene oxide) (PEO) and poly(propylene oxide) (PPO), PEO/PPO type amphiphilic block copolymer include PEO-PPO-PEO (A-B-A type) block copolymers, PPO-PEO-PPO (B-A-B type) block copolymers, PEO-PPO (A-B type) block copolymers, and PEO, PPO homopolymers.

Copolymers can comprise, among other things, solubilizing components, such as, for example, poly(ethylene oxide) (PEO), poly(vinyl alcohol) (PVA), poly(vinyl pyrolidone) (PVP), polyacrylates, dextran, gelatine, polysaccharides, proteins; and/or components that impart self-association properties, such as, for example, poly(propylene oxide) (PPO), poly(butylene oxide) (PBO), polyethylene, polybutadiene, and polystyrene.

A graft copolymer is a polymer comprising molecules in which the main backbone chain of atoms has attached to it at various points side chains containing different atoms or groups from those in the main chain. The main chain may be a copolymer or may be derived from a single monomer.

In the present invention, a copolymer is used which has at least a first polymer and a second polymer. The first polymer is characterized as having a greater reducing activity than the second polymer and the second polymer is characterized as having a greater stabilizing activity than the first polymer.

The term "reducing activity" as used herein refers to the ability of a polymer to convert metal ions to metal atoms. The reducing activities of two polymers can be compared by determining yield of metal atoms from metal ions under a given set of conditions (such as choice of solvent, temperature etc.), in which both polymer and metal ion are dissolved.

The term "stabilizing activity" as used herein refers to the ability of a polymer to adsorb on to the surface of metal nanoparticles. The stabilizing activity of two polymers can be compared by measuring by standard techniques (such as light scattering and the like), the amount of the two polymers adsorbed on to the surface of metal nanoparticles. In general, longer polymer blocks of stabilizing component are more stabilizing than shorter blocks. Also, less soluble polymer blocks generally exert a greater stabilizing influence upon particles in a dispersion than more soluble blocks. As solubility of a component decreases, stabilizing ability generally increases. The stabilizing component is largely responsible for the ability of particles to remain in a dispersion.

When copolymers comprising PEO and PPO are used, the PEO component functions as the primary reducing component, and the PPO component functions as the primary stabilization component. The reducing component reduces metal salt ions in solution to elemental metal. Thus, increasing the PEO content of the copolymer tends to increase the efficiency of metal ion reduction. Other types of polymeric units can be used as reducing components, such as, for example, those bearing hydroxyl groups, carboxyl groups, amino groups, hydroperoxide groups (ROCOOH; R is a hydrocarbon chain), ascorbic acid ($C_6H_8O_6$) and borohydride ($BH_4$). However, the reducing component of the block copolymer is greater than 80 wt % PEO, and preferably greater than 95 wt % PEO.

In PEO/PPO copolymers, stabilizing polymer units other than PPO can be included. To be a "stabilizing component" means to limit particle growth (particle size increase) through metal ion reduction and/or aggregations. Suitable stabilizing polymer units are typically carbon-oxygen chains, optionally having a degree of saturation, having a length which includes a total of up to 10 carbon and oxygen atoms, but having no more than 3 oxygen atoms. The carbon chains preferably bear hydrophobic group side chain groups, such as alkyl, alkenyl or phenyl-containing groups having up to 10 carbons, or other side chains which act to impart colloidal stability to the particle suspension. Other side chains which can be used are alkyl thiol and alkyl amino. However, preferably the stabilizing component comprises greater than 50 wt % PPO, and preferably greater than 95 wt % PPO.

The copolymer preferably has an average molecular weight above about 1000 grams per mole, and more preferably in the range of from about 5000 and about 500,000 grams per mole. It is desirable that the copolymer contains in the range of from about 10 to about 90 percent by weigh PPO, and contains in the range of from about 10 to about 90 percent PEO, with a combined PEO/PPO weight percent in the range of from about 80 to 100 percent.

The polymer may include monomer species or chains ("blocks") of monomer species which are able to impart solubility to the copolymer, such as, for example, poly(ethylene oxide), poly(vinyl alcohol), poly(vinyl pyrolidone), polyacrylates, dextran, gelatine, polysaccharides, peptides; and/or that impart self-association properties, such as, for example, poly(propylene oxide), poly(butylene oxide), polyethylene, polybutadiene, polystyrene. Many different polymer architectures can be used, such as dendrimers, for example, or random, block or star copolymers.

The term "PEO/PPO" type amphiphilic block copolymer includes PEO-PPO-PEO triblock copolymers, PPO-PEO-PPO triblock copolymers, and PEO-PPO diblock copolymers, as well as graft, multiblock and random PEO/PPO copolymers. Non-limiting examples of block copolymers which can be used in the present invention are summarized in Table 1.

The salt concentration in the solution is in the range of from about $10^{-5}$ M up to the solubility of the salt in the given solution. The concentration of metal ion in the particle formation solution is preferably in the range of from $10^{-4}$ to $10^{-2}$ M. The copolymer concentration in the solution can be present in very small amounts, up to almost 100 percent. However, at the low end of the salt and polymer concentration ranges, the metallic nanoparticles may be too few or too small to readily detect.

The molecular weight of the copolymer is selected such that particles with desired shape and size properties are formed. In general, a polymer average molecular weight in the range of from 1000 to 20,000 grams per mole is preferred.

The process of the present invention can be used to form nanoparticles of metals which include gold, silver, platinum, copper, iron, palladium, cobalt, nickel, zinc, chromium, manganese, magnesium, cadmium and aluminum. The metal-containing ions which can be used include, for example, $Ag^+$ and $AuCl_4^-$ as well as other metal-containing ions, such $Ag(CN)_2^-$, $AlCl_4^-$, $Au^{3+}$, $AuBr_4^-$, $PtCl_6^{2-}$, $Mg^{2+}$, $Mn^{2+}$, $Co^{2+}$, $Ni^{2+}$, $Cu^{2+}$, $Zn^{2+}$, $Cd^{2+}$, $Fe^{3+}$, $Al^{3+}$ and $Pd^{2+}$ $Mg^{2+}$, $Mn^{2+}$, $Co^{2+}$, $Ni^{2+}$, $Cu^{2+}$, $Zn^{2+}$, $Cd^{2+}$, $Al^{3+}$ and $Pb^{2+}$.

Exemplary salts which can be used are $AuBr_3$, $KAuBr_4$, $NaAuBr_4$, $AuCl_3$, $KAuCl_4$, $NaAuCl_4$, $HAuCl_4$, $AuI_3$, $Au_2S_3$, $AgAsF_6$, $AgBF_4$, $AgBr$, $AgCl$, $AgClO_3$, $AgClO_4$, $AgF$, $AgF_2$, $AgF_6P$, $AgF_6Sb$, $AgI$, $AgIO_3$, $AgMnO_4$, $AgNO_2$, $AgNO_3$, $AgO_3V$, $AgO_4Re$, $Ag_2CrO_4$, $Ag_2O$, $Ag_2O_3S$, $Ag_2O_4S$, $Ag_2S$, $Ag_2Se$, $Ag_2Te$, $Ag_3AsO_4$, $Ag_3AsO_4$, $Ag_3AsO_4$, $Ag_3O_4P$, $Ag_8O_{16}W_4$, $KAg(CN)_2$, $CH_3CO_2Ag$, $AgCN$, $AgCNO$, $AgCNS$, $Ag_2CO_3$, $AlCl_3O_{12}$, $AlCl_4Cs$, $AlCl_4K$, $AlCl_4Li$, $AlCl_4Na$, $AlCl_2Ti_3$, $AlCsO_4Si$, $AlCsO_6Si_2$, $AlCsO_8S_2$, $AlF_4K$, $AlF_6Na_3$, $AlKO_8S_2$, $AlLiO_2$, $AlN_3O_9$, $AlO_4P$, $AlO_9P_3$, $Al_2BaO_4$, $Al_2MgO_4$, $Al_2O_5Ti$, $Al_3O_{12}S_3$, $Al_6Bi_2O_{12}$, $Al_6O_{13}Si_2$, $H_4AlLi$, $H_4AlNO_8S_2$, $HAuCl_4N$, $AuCN$, $CoF_2$, $CoF_3$, $CoI_2$, $CoLiO_2$, $CoN_2O_6$, $CoN_6Na_3O_{12}$, $CoO$, $CoO_4S$, $CoSe$, $Co_3O_4$, $Co_3O_8P_2$, $Co_5Sm$, $Co_7Sm_2$, $H_8CoN_2O_8S_2$, $H_{12}CoN_9O_9$, $H_{15}Cl_3CoN_5$, $CoCO_3$, $CdCl_2$, $CdCl_2O_8$, $CdF_2$, $CdI_2$, $CdMoO_4$, $CdN_2O_6$, $CdO_3Zr$, $CdO_4S$, $CdO_4W$, $CuF_2$, $CuI$, $CuMoO_4$, $CuN_2O_6$, $CuNb_2O_6$, $CuO$, $CuO_3Se$, $CuO_4S$, $CuO_4W$, $CuS$, $CuSe$, $CuTe$, $Cu_2HgI_4$, $Cu_2O$, $Cu_2O_7P_2$, $Cu_2S$, $Cu_2Se$, $Cu_2Te$, $H_8Cl_4CuN_2$, $H_{12}CuN_4O_4S$, $CuCN$, $CuCNS$, $MgMn_2O_8$, $MgNoO_4$, $MgN_2O_6$, $MgO_3S_2$, $MgO_3Ti$, $MgO_3Zr$, $MgO_4S$, $MgO_4W$, $Mg_2O_7P_2$, $Mg_3O_8P_2$, $H_4MgNO_4P$, $MnMoO_4$, $MnN_2O_6$, $MnNoO_4$, $MnO_4S$, $H_4MnO_4P_2$, $NiO$, $NiO_3Ti$, $NiO_4S$, $H_4N_2NiO_6S_2$, $H_2PtCl_6$, $H_6Cl_2N_2Pt$, $H_6Cl_4N_2Pt$, $H_6N_4O_4Pt$, $H_6Na_2O_6Pt$, $H_8Br_6N_2Pt$, $H_8Cl_4N_2Pt$, $H_8Cl_6N_2Pt$, $H_8O_6Pt$, $H_{12}Cl_2N_4Pt$, $H_{12}Cl_4N_4Pt_2$, $H_{12}N_6O_6Pt$, $H_{14}N_4O_2Pt$, $C_2N_2Pt$, $H_6Br_2N_2Pd$, $H_6Cl_2N_2Pd$, $H_6I_2N_2Pd$, $H_6N_4O_4Pd$, $H_8Cl_4N_2Pd$, $H_8Cl_6N_2Pd$, $H_{12}Br_2N_4Pd$, $H_{12}Cl_2N_4Pd$, $H_{12}Cl_4N_4Pd_2$, $H_{12}N_6O_6Pd$, $C_2N_2Pd$, $H_4FeNO_8S_2$, $H_8FeN_2O_8S_2$, $FeCl_3$, $C_2N_2Zn$.

The formation of particles, rods and nanowires can take place over a wide range of temperatures. In general, the temperature at which particle formation occurs is between the freezing and boiling points of the particle formation solutions, and thus, the range of particle formation temperatures is solvent dependent. However, temperatures in the range of from 4° C. and 100° C. are preferred.

The particles (including plates rods and nanowires) formed by the method above generally have diameters and short dimensions in the range of from 0.001 to 10 microns.

Solvents which can be used in the process of the present invention include water and polar organic solvents such as methanol, ethanol, propanol, formamide and N,N-dimethylformamide. Other solvents which can be used include ethyl acetate, glycerol, ethylene glycols (e.g., ethylene glycol, triethylene glycol, tetraethylene glycol, pentaethylene glycol, hexaethylene glycol, octatethylene glycol, nonaethylene glycol, decaethylene glycol, dodecaethylene glycol), acetaldehyde, acetone, tetrahydrofuran (THF), 1-butanol and ionic liquids (e.g., 1-ethyl-3-methylimidazoium chloride, 1-ethyl-3-methylimidazoium bromide, 1-ethyl-3-methylimidazoium iodide, 1-ethyl-3-methylimidazoium trifluoromethanesulfonate, 1-ethyl-3-methylimidazoium tetrafluoroborate, 1-ethyl-3-methylimidazoium hexafluorophoshate, 1-n-butyl-3-methylimidazolium chloride, 1-n-buthlpyridinium hexafluorophoshate.

The particle formation solution of the present invention comprises a copolymer, a metal ion, and a solvent. The particle formation solution can be formed in many ways. The copolymer and the metal salts can be combined simultaneously or sequentially, one or both as powder or in the form of solutions, to form the particle formation solution. Metal nanoparticle synthesis is achieved by simply combining the polymer, metal salt and solvent into a single solution, and allowing it to stand until a suspension of nanoparticles is formed. Agitation such as, for example, with a homogenizer or ultrasonic irradiation, is not required. Agitation can lead to an increase of reaction rate, a decrease of particle size, and/or decrease of rod or wire structure. Agitation can affect the molecular diffusion of metal ions and polymers in solutions (that enhances complexation of metal ions and polymers) and the polymer adsorption process on the surface of metal particles (that prevents particles from aggregations and/or networks).

The application of external energy sources such as ultraviolet irradiation, heating, etc., is not required, and particle formation proceeds efficiently at ambient light.

Particle formation will typically take place within 48 hours of preparing the particle formation solution, depending on the temperature of the particle formation solution. In some cases, particle formation can occur in as little time as 2 hours or even less.

The particles can be separated from solution by centrifuging until precipitation, optionally after dilution with solvent (e.g., water). After an the supernatant (solution) is removed, excess liquid can be removed by heating or applying vacuum. Other separation techniques such as chromatography, filtration, precipitation or extraction can be used to remove metal particles from solutions.

Examples 1 and 2 demonstrate the successful formation of metallic nanoparticles by the method described herein.

Also provided by the present invention is a method for controlling the size of the nanoparticles formed in the particle formation solution. The balance between metal ion reduction in the bulk solution and on the surface of metal particles determines particle size. Two important factors affecting the balance are metal ion reduction activity and polymer adsorption on the surface of metal particles.

Larger particles are formed in the case that PEO/PPO block copolymers which are adsorbed on the surface of metal particles cause reduction of metal ions to occur predominately at the surface of particles already formed rather than creating new particles in the bulk solutions. Ways to increase the size of particles formed include (i) increasing overall chain length and/or PEO block length of PEO-PPO-PEO block copolymers, (ii) increasing block copolymer concentration. (iii) increasing metal ion concentration (iv) switching to a solvent with a larger dipole moment (formamide rather than, for example, water), or (v) increasing temperature (~25 to ~90 or ~100° C.). See Example 5-8, 11, 15, 17 and 19.

Smaller particles are formed in the case that ion reduction takes place at PEO/PPO block copolymers in the bulk solutions rather than at block copolymers adsorbed on the surface of metal particle. (i) decreasing overall chain length and/or PEO block length of PEO-PPO-PEO block copolymers and/or PEG block length, (ii) decreasing block copolymer concentration (iii) reducing metal ion concentration, (iv) switching to a solvent with a smaller dipole moment (water rather than, for example, formamide and (v) reducing temperature. See Examples 5 and 12.

Colloidal stabilization is also defined in terms of how long particle dispersion remains unchanged (without particle size increase and/or precipitation). Examples 9 and 10 demonstrate the increase in colloidal stability due to a fifty-fold increase in polymer content. The effect of reducing PPO content is overwhelmed by an increase in polymer concentration.

The shape of metallic nanoparticles is controlled by choice of (i) block copolymer characteristics, (ii) block copolymer concentration, (iii) metal salt type, (iv) metal salt concentration, (v) solvent and (vi) temperature. An important factor in shape control is the specific adsorption of PEO-PPO block copolymers on crystal facets, preventing or inhibiting growth perpendicular to the facet while elongation can occur in other directions. Particle shapes which can be formed with the process of the present invention include spherical, triangular, square, pentagonal, hexagonal, polyhedral, cylindrical rod, wire and other shapes.

Spherical particles are formed in a particle formation solution comprising a polymer of the form $EO_xPO_yEO_x$, or $PO_yEO_xPO_y$, where x (the number of EO segments in one block) is in the range of from 1 to 500; y (the number of PO segments in one block) is in the range of from 1 to 300; at a wt % in the range of from 0.1 to 70 wt %; a metal salt, preferably a gold or silver salt, in a concentration in the range of from $10^{-5}$ to $3 \times 10^{-4}$ M; and a temperature in the range of from 4 to 100° C. If the salt is a silver salt, the solvent is preferably formamide. See Examples 11-14.

In order to form polyhedral particles, it is preferred that x is in the range of from 1 to 500; y is in the range of from 0 to 300; the copolymer has an average molecular weight in the range of from 1000 to 20,000 and is present in a wt % in the range of from 0.1 to 70 wt %; a metal salt, preferably a gold or silver salt, is present in a concentration in the range of from $10^{-4}$ to $10^{-2}$ M; and temperature is in the range of from 4 to 100° C. Examples 15 through 17 demonstrate the formation of polyhedral gold particles.

In order to form triangle/hexagonal gold plates, it is preferred that x is in the range of from 1 to 500; y is in the range of from 1 to 300; the copolymer has an average molecular weight in the range of from 1000 to 30,000 and is present in a concentration in the range of from 0 to 100 wt %; a metal salt, preferably a gold or silver salt, is present in a concentration in the range of from $4 \times 10^{-4}$ to $10^{-2}$ M; and temperature is in the range of from 4 to 100° C. Example 18 demonstrates the formation of triangle/hexagonal gold plates.

Irregular metal nanoparticles can be formed when x is in the range of from 1 to 500; y is 0, an average molecular weight is in the range of from 1000 to 20,000 and is present in a concentration in the range of from 0.1 to 70 wt %; a metal salt, preferably a gold or silver salt, is present in a concentration in the range of from $10^{-4}$ to $10^{-3}$ M; and temperature is in the range of from 4 to 100° C. Example 19 demonstrates the formation of irregularly-shaped particles.

Without desiring to be bound by theory, it is considered that adsorption of PEO homopolymers to the surface of metal particles is reduced relative to PEO-PPO-PEO, PPO-PEO- PPO, or PEO-PPO block copolymers due to the lack of hydrophobic groups (PPO) in the polymer. Accordingly, few facets occur on the surface of metal particles for metal ion reduction, giving metal particles having irregular shapes.

In one embodiment, the solvent used in the particle formation solution can be selected such that particles of a given size can be obtained. Without desiring to be bound by theory, it is thought that solvents act to partially shield the metal or metal-containing ions in solution from the attractive force exerted by the block copolymer. The greater the dipole moment, the greater the shielding effect, corresponding to a reduced degree of "seed" particle formation. As a result, reduction of the metal occurs mainly at the surface of particles which have already formed.

Figure 2:
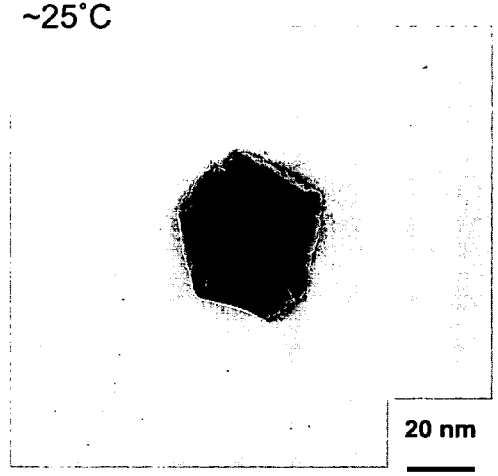
FIG. 2. High-resolution TEM images (left images) and electron diffraction patterns (right images) of gold particles synthesized in 10 wt % $EO_{37}PO_{56}EO_{37}$ formamide solutions at ambient conditions (~25° C.) for 2 days (upper images) and a~100° C. for 30 min (bottom images). The scale bar represents 20 nm.
Figure 2:
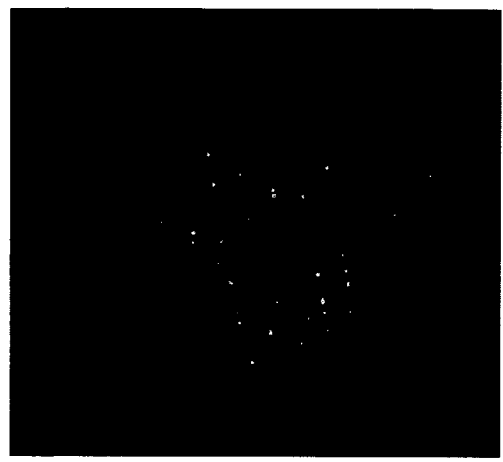
Figure 2:
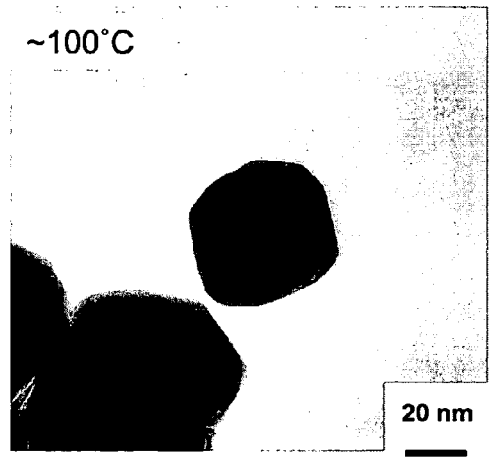
Figure 2:
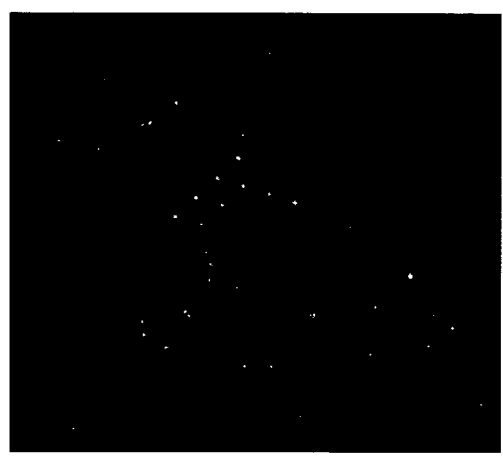
Figure 3:
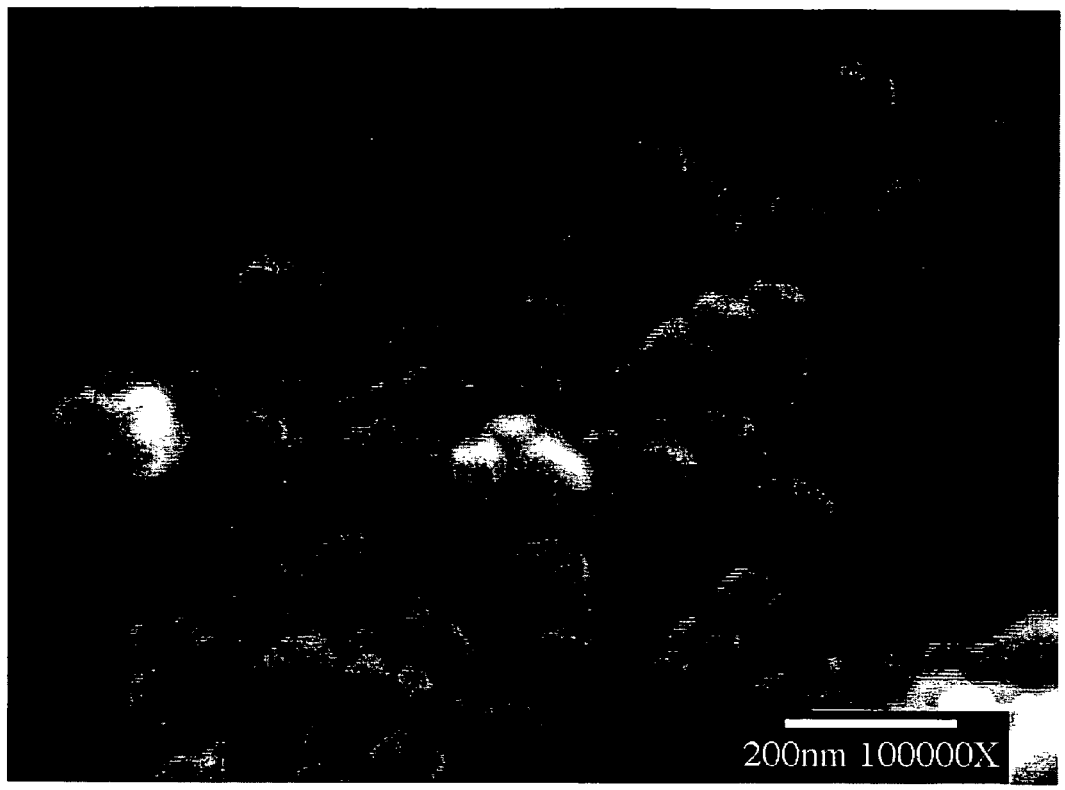
FIG. 3. SEM image of gold particles synthesized in 10 wt % $EO_{37}PO_{56}EO_{37}$ formamide solutions at ~100° C. for 30 min.
Figure 4:
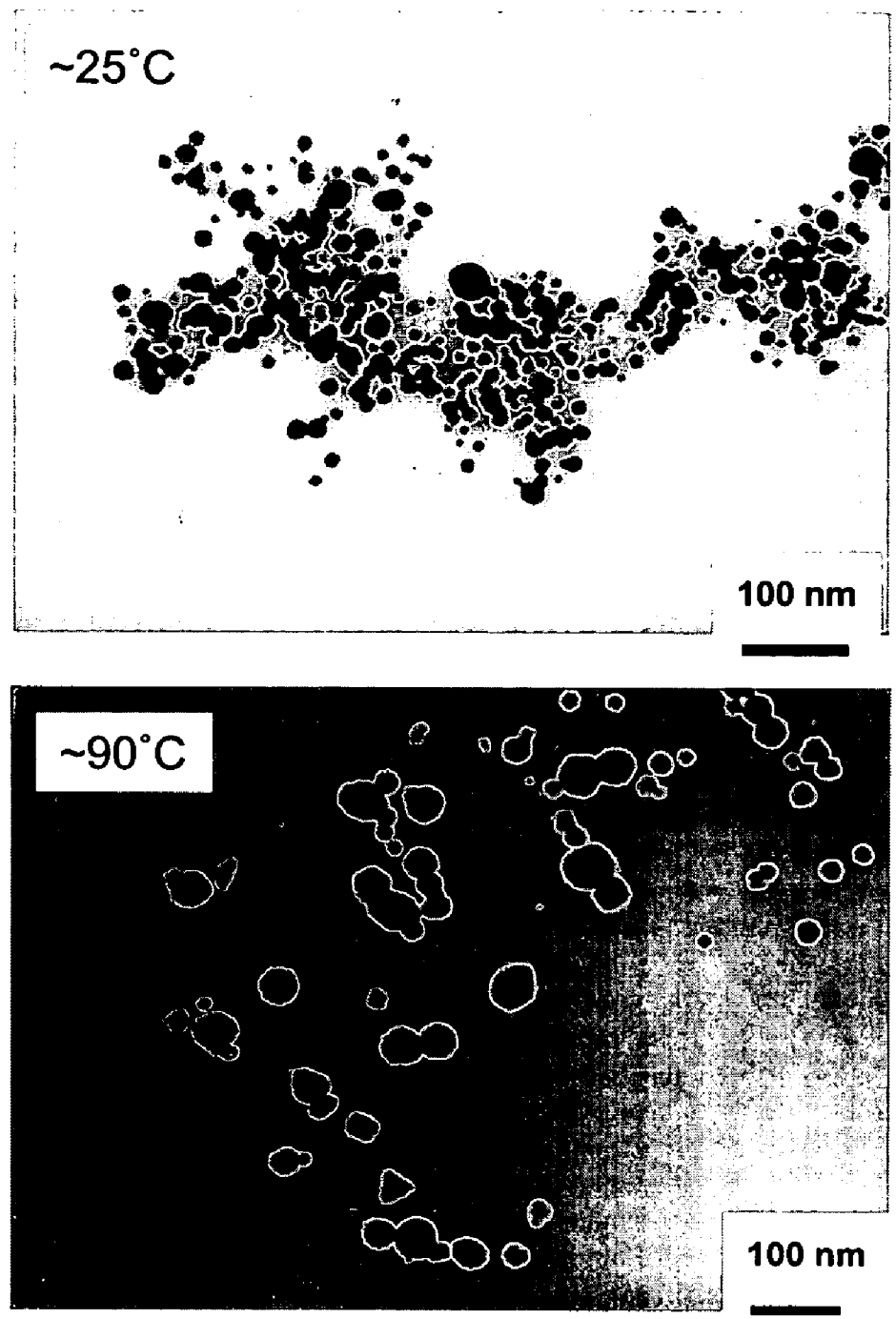
FIG. 4. TEM images of gold particles synthesized in 10 wt % $EO_{37}PO_{56}EO_{37}$ aqueous solutions at ambient conditions (~25° C.) (upper image) and at ~90° C. for 30 min (bottom image). The scale bar represents 100 nm.

Solvents which can be used instead of or in addition to water are formamide, methanol, ethanol, propanol, formamide and N,N-dimethyleformamide, ethyl acetate, glycerol, ethylene glycols (e.g., ethylene glycol, triethylene glycol, tetraethylene glycol, pentaethylene glycol, hexaethylene glycol, octatethylene glycol; nonaethylene glycol, decaethylene glycol, dodecaethylene glycol), acetaldehyde, acetone, tetrahydrofuran (THF), 1-butanol and ionic liquids (e.g., 1-ethyl-3-methylimidazoium chloride, 1-ethyl-3-methylimidazoium bromide, 1-ethyl-3-methylimidazoium iodide, 1-ethyl-3-methylimidazoium trifluoromethanesulfonate, 1-ethyl-3-methylimidazoium tetrafluoroborate, 1-ethyl-3-methylimidazolium hexafluorophoshate, 1-n-butyl-3-methylimidazolium chloride, 1-n-buthlpyridinium hexafluorophoshate, etc. In one embodiment, the block copolymer has a number of EO segments between 1 and 500, a number of PO segments between 1 and 300, and an average molecular weight in the range of from 1000 to 20,000 grams per mole. Compare FIGS. 1, 2 and 3 (water solvent) to FIG. 4 (formamide solvent). The dipole moment of water is 1.85 Debye, and the dipole moment of formamide is 3.73 Debye. The formamide run produced significantly larger particles.

Figure 5:
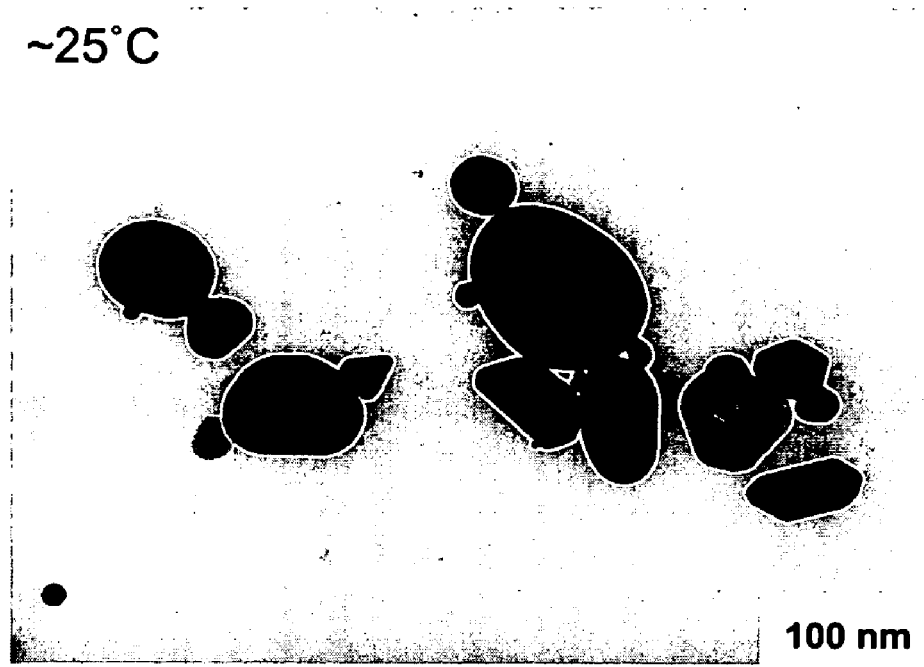
FIG. 5. TEM images of gold particles synthesized in 10 wt % $EO_{136}$ aqueous solutions at ambient conditions (~25° C.) for 2 days (upper image) and at ~100° C. for 30 min (bottom image). The scale bar represents 100 nm.
Figure 5:
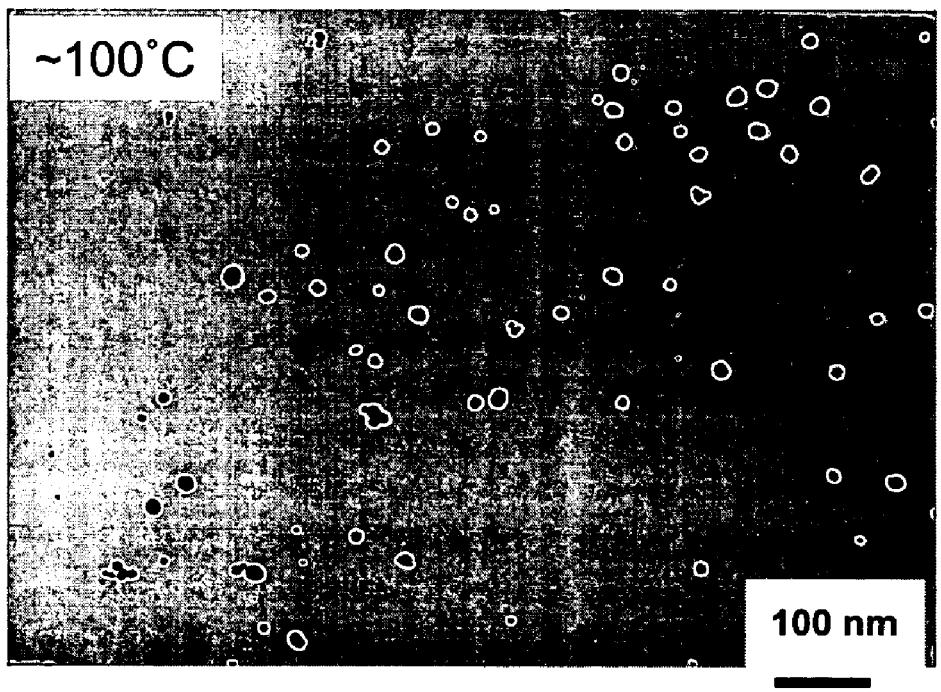
Figure 6:
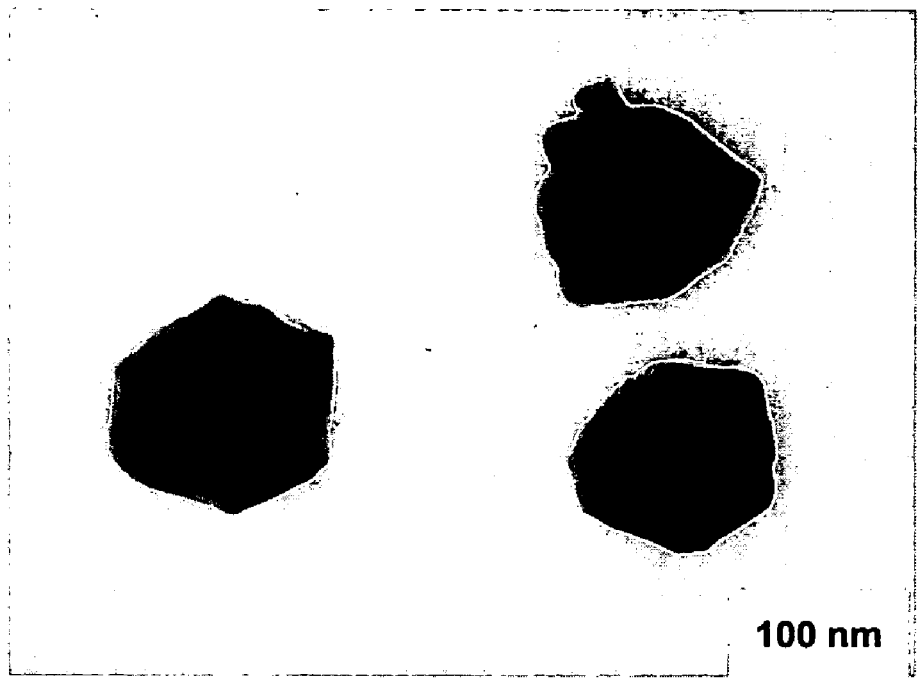
FIG. 6. TEM image (upper image) and electron diffraction pattern (bottom image) of gold particles synthesized in 10 wt % $EO_{136}$ formamide solutions at ~100° C. for 30 min. The scale bar represents 100 nm.
Figure 6:
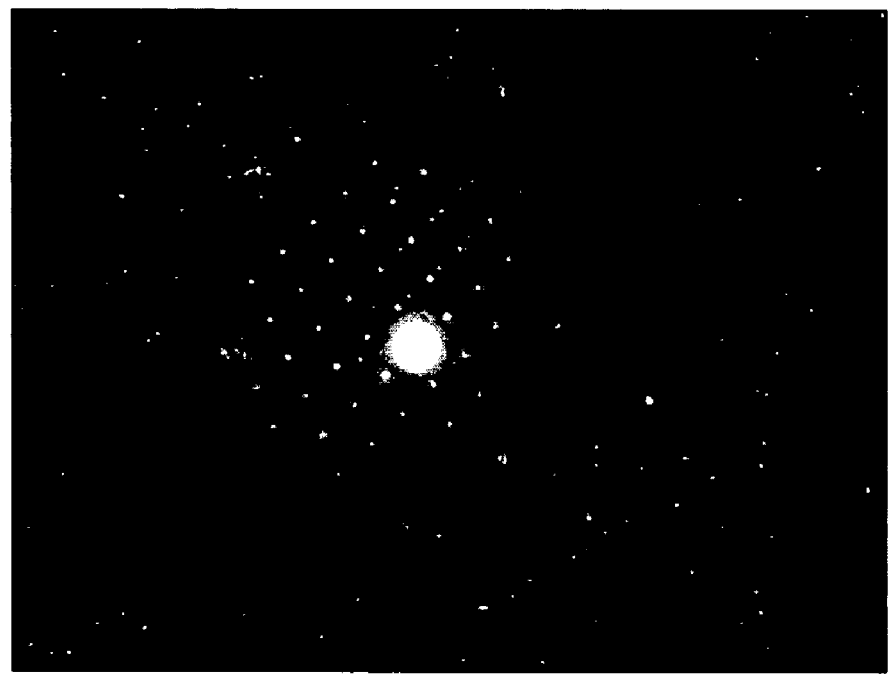
Figure 7:
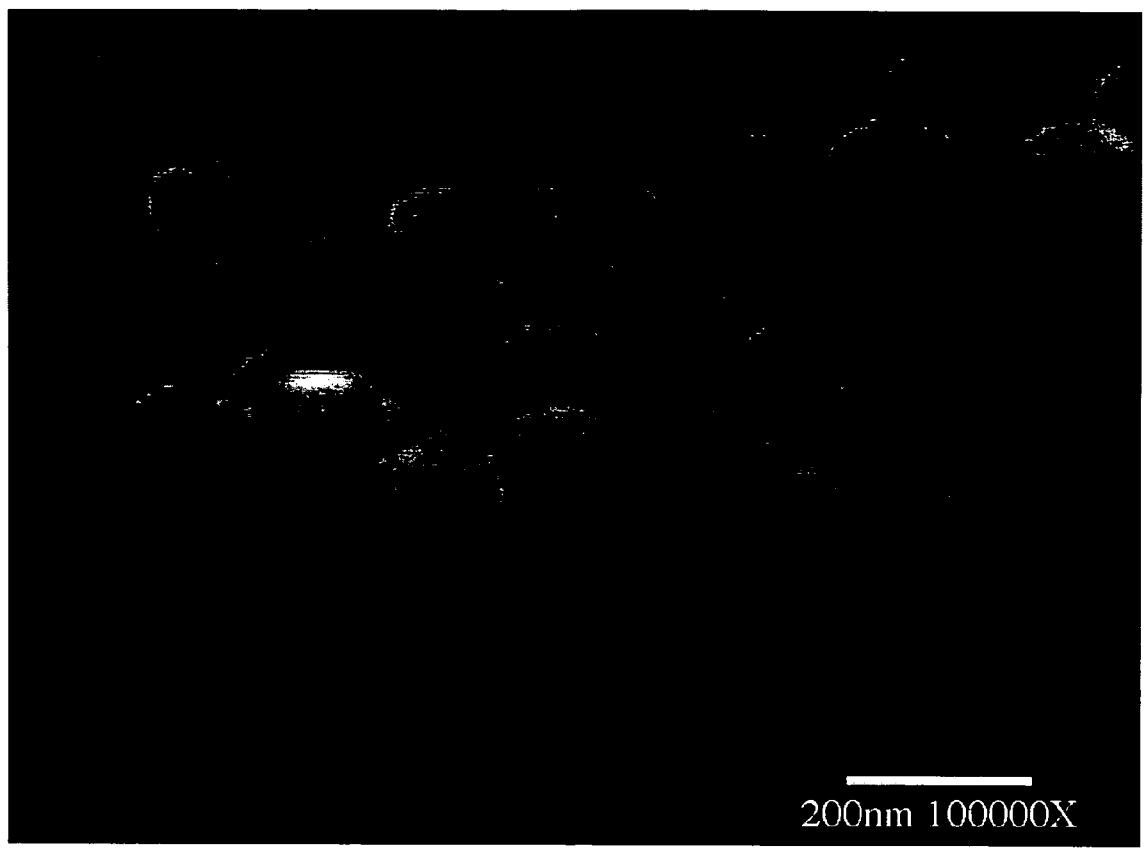
FIG. 7. SEM image of gold particles synthesized in 10 wt % $EO_{136}$ formamide solutions at ~100° C. for 30 min.

The temperature at which particle formation is carried out can affect particle size. Without desiring to be bound by theory, it is thought that heating increases the hydrophobicity of some types of block copolymer, particularly those having number of EO segments in the range of from 1 to 500, number of PO segments in the range of from 1 to 300, and an average molecular weight in the range of from 1000 to 20,000 grams per mole. As in the case of solvent dipole moment effect, the attractive interaction between the metal/metal-containing ion and the polymer is reduced, and ion reduction occurs mainly at the surface of existing particles. In two embodiments using water and formamide as solvents, average particle diameter increases by ~2 times larger and 1.6 times, respectively when the temperature at which particle formation occurs is raised from 25° C. to 100° C. and 90° C., respectively. See FIGS. 1 and 4. In contrast, polymers which have no PPO component actually give a decrease in size upon heating. See FIG. 5. It is thought that FIGS. 6 and 7 demonstrate that in formamide, the shielding effect of formamide on the complexation of $AuCl_4^-$ ions with polymers appears more significant than the polymer availability and hydrophobicity. As a result, the metal ion reduction activity becomes lower, and the particle size increases even when PEO homopolymer is used to prepare the metal particles.

Figure 8:
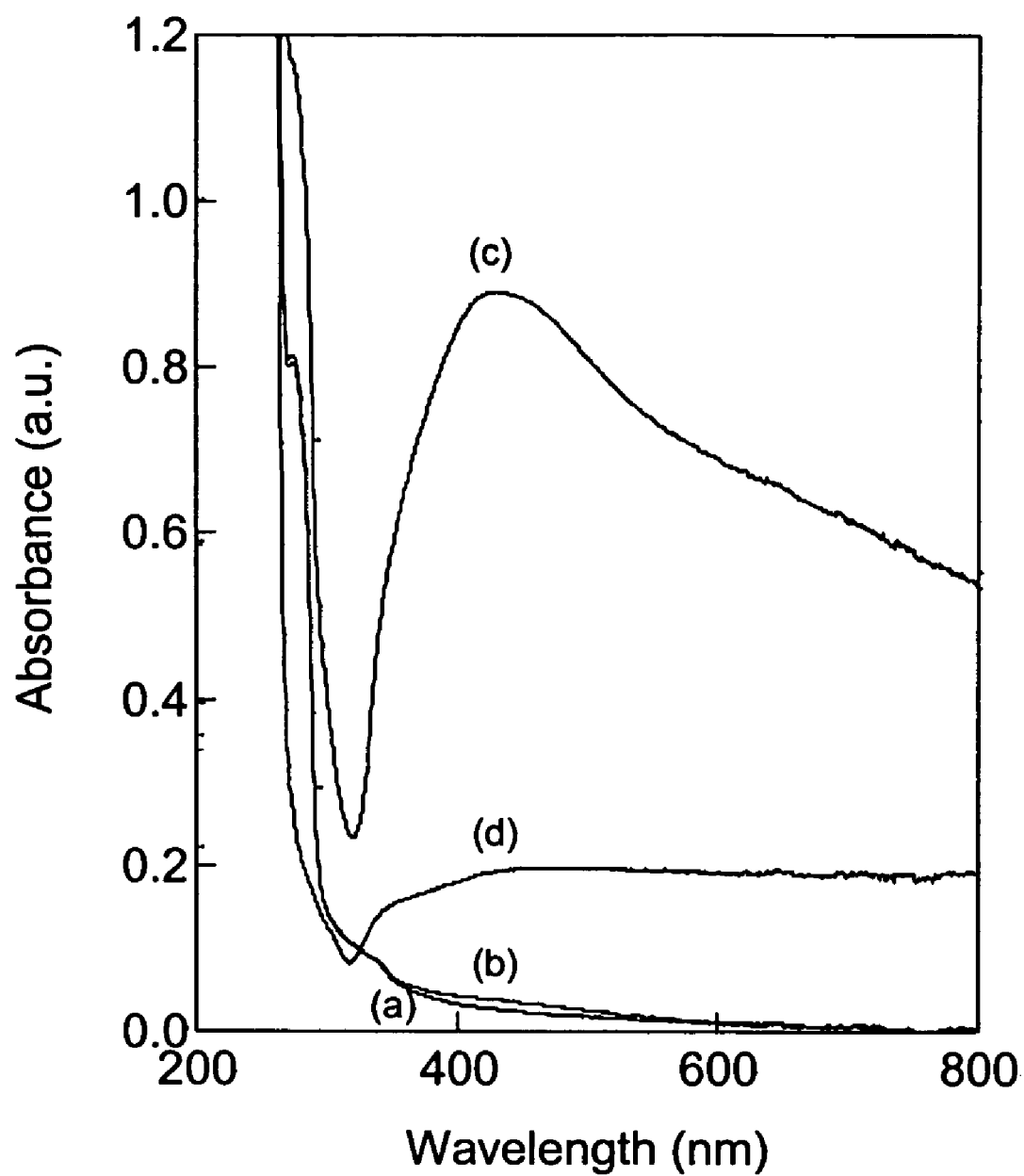
FIG. 8. Absorption spectra recorded at ~2 days after reaction was initiated (mixing of 10 wt % $EO_{37}PO_{56}EO_{37}$ formamide solutions with $Ag^+$ aqueous solution) at ~25 (line (a)); and at ~30 min after reaction was initiated at ~50 (line (b)) and ~100° C. (line (c)). Also shown in FIG. 2-1 is absorption spectra recorded at ~30 min after $Ag^+$ formamide solution (absence of polymers) left standing at ~100° C. (line (d)).
Figure 9:
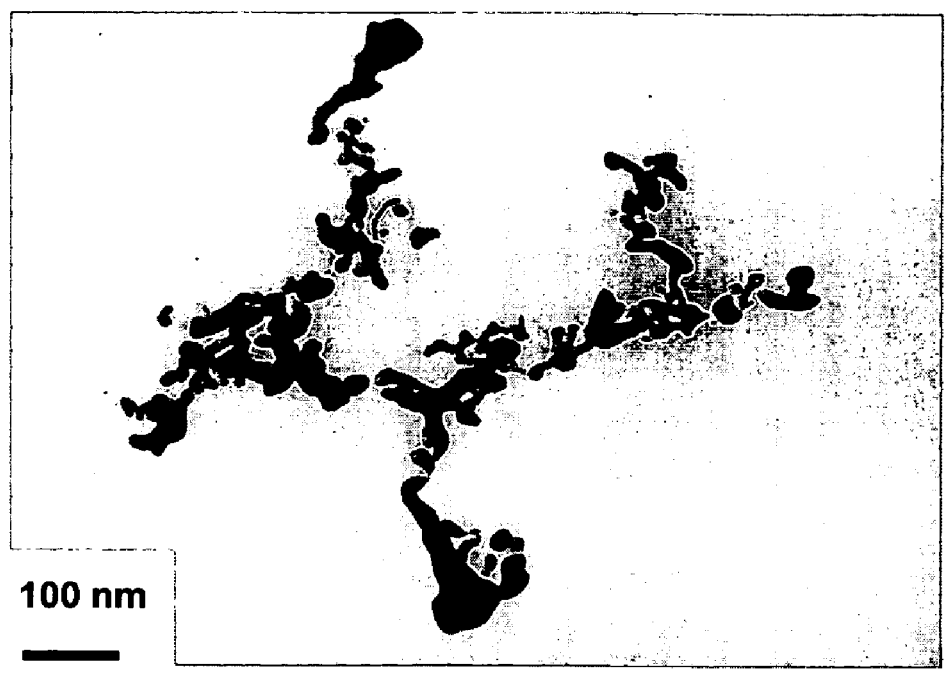
FIG. 9. TEM (upper) and high-resolution TEM (bottom) images of Ag whiskers and their networks synthesized in 10 wt % $EO_{37}PO_{56}EO_{37}$ formamide solutions at ~100° C.
Figure 9:
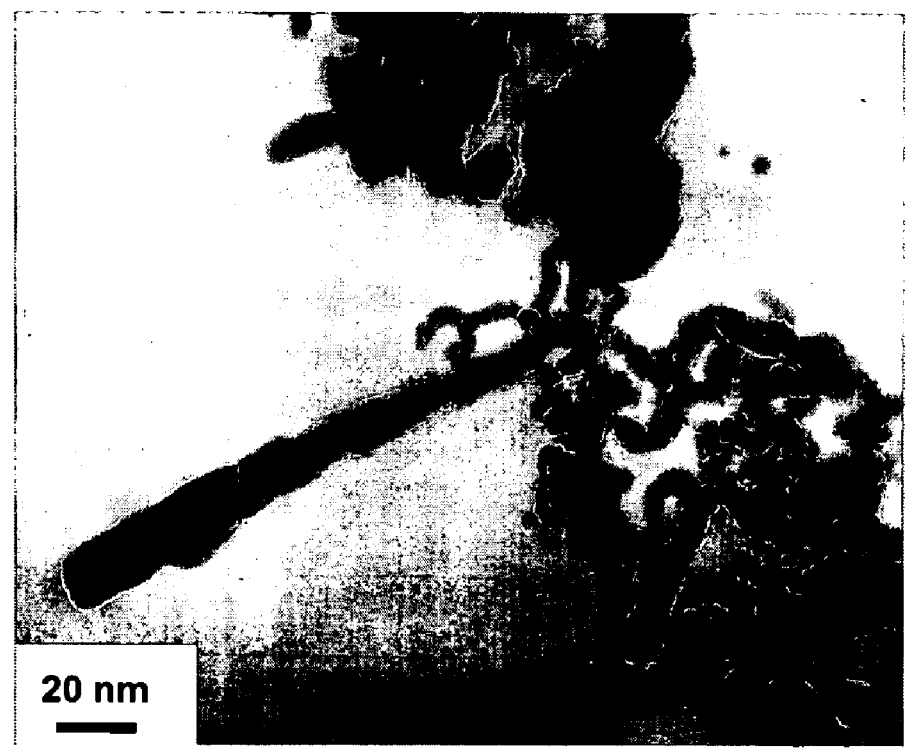
Figure 10:
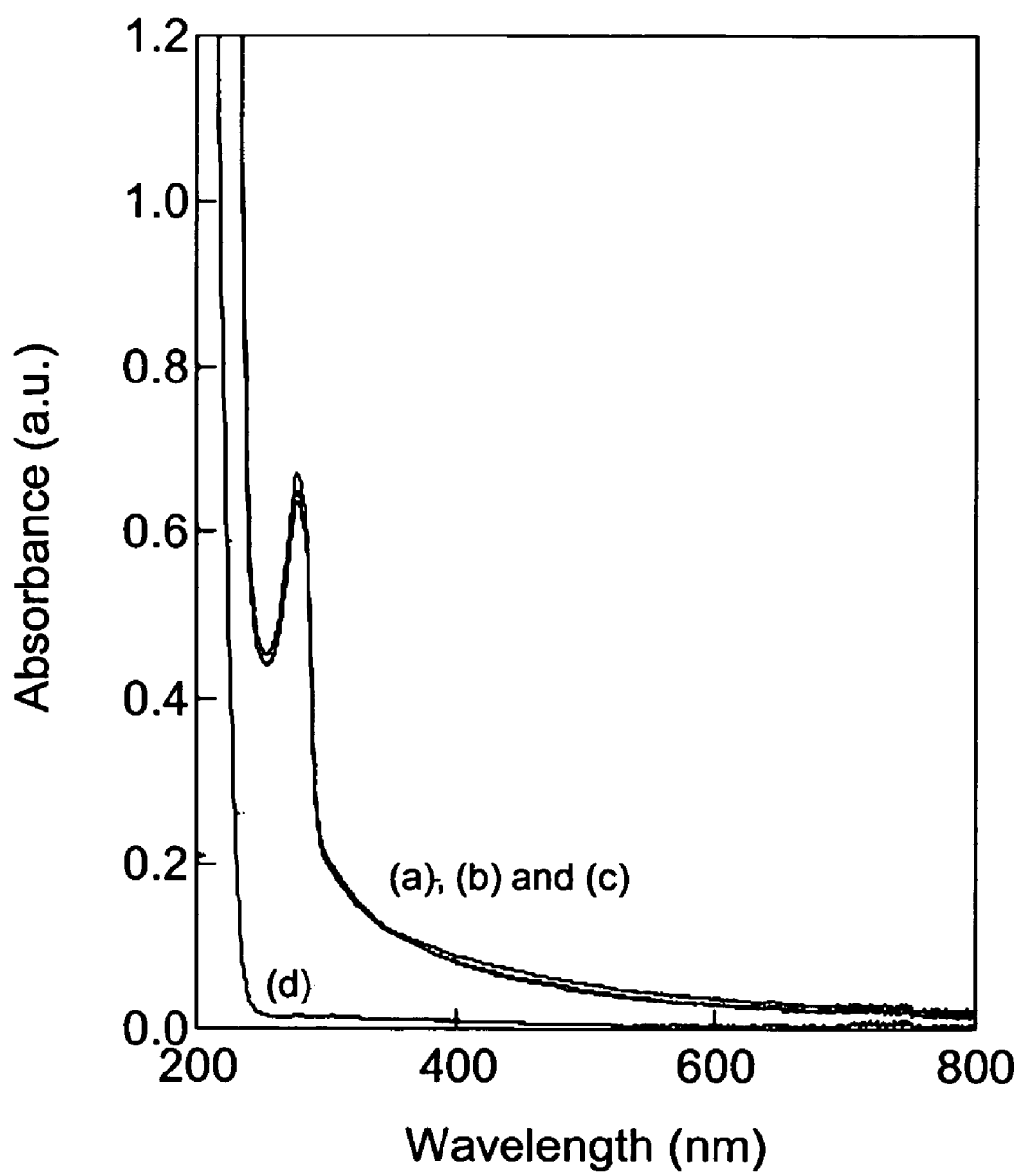
FIG. 10. Absorption spectra recorded at ~2 days after reaction was initiated (mixing of 10 wt % $EO_{37}PO_{56}EO_{37}$ aqueous solutions at ~25 (line (a)), and at ~30 min after reaction was initiated at ~50 (line (b)) and ~100° C. (line (c)). Also shown in FIG. 2-3 is absorption spectra recorded at ~30 min after $Ag^+$ aqueous solution (absence of polymers) left standing at ~100° C. (line (d)).
Figure 11:
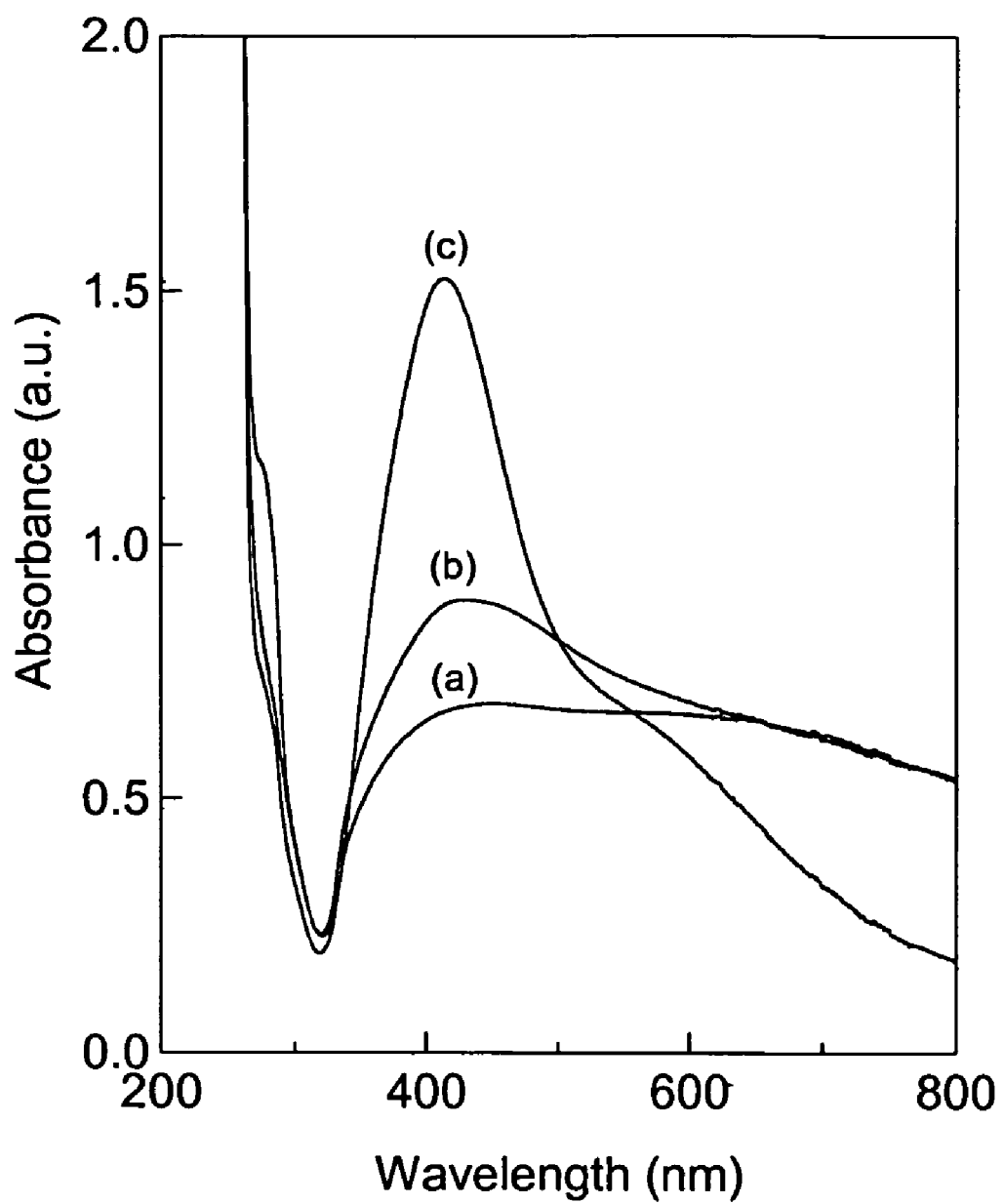
FIG. 11. Absorption spectra recorded at ~30 min after the reaction was initiated (mixing of 10 wt % $EO_xPO_yEO_x$ formamide solutions with $Ag^+$ aqueous solution) at ~100° C.; $EO_{17}PO_{60}EO_{17}$ (line (a)), $EO_{37}PO_{58}EO_{37}$ (line (b)), and $EO_{132}PO_{50}EO_{132}$ (line (c)) block copolymers.
Figure 12:
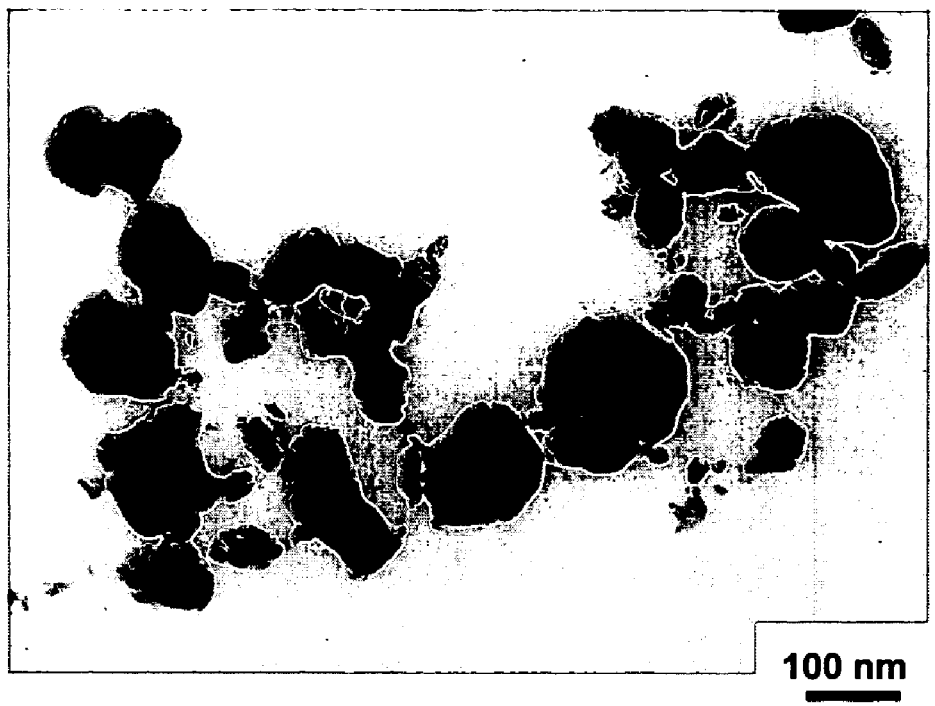
FIG. 12. TEM images of Ag colloids produced in formamide containing 10 wt % $EO_{136}$ homopolymer (upper image) and 10 wt % $EO_{19}PO_{69}EO_{19}$ block copolymer at ~100° C.
Figure 12:
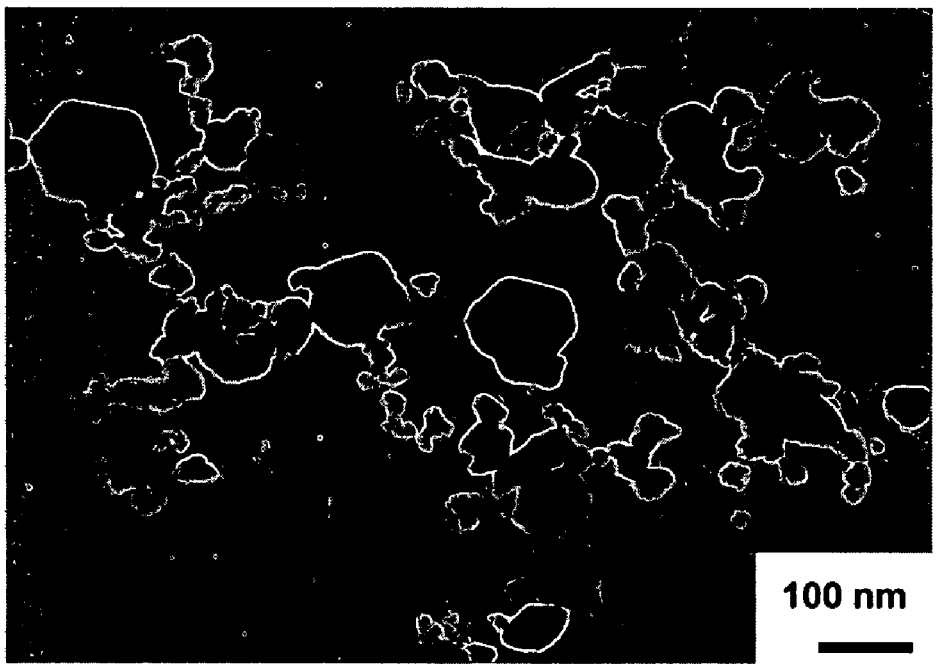
Figure 13:
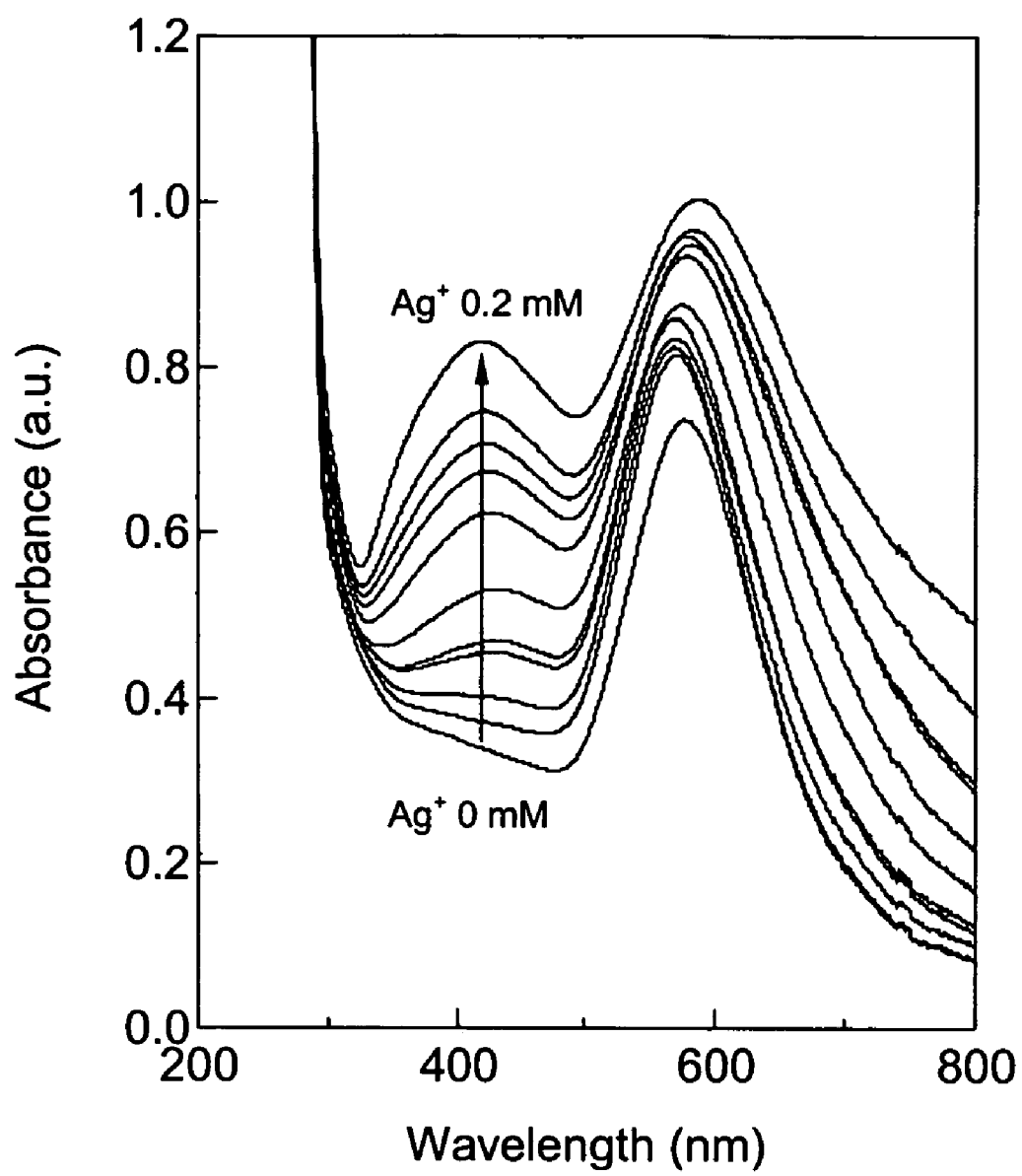
FIG. 13. Absorption spectra recorded at ~30 min after reaction was initiated (mixing of 10 wt % $EO_{37}PO_{56}EO_{37}$ formamide solutions with $Ag^+$ aqueous solution) at different $Ag^+$ concentrations added to Au seed dispersion. Allow represents $Ag^+$ concentration increase from 0 to 0.2 mM with interval of 0.02 mM.
Figure 14:
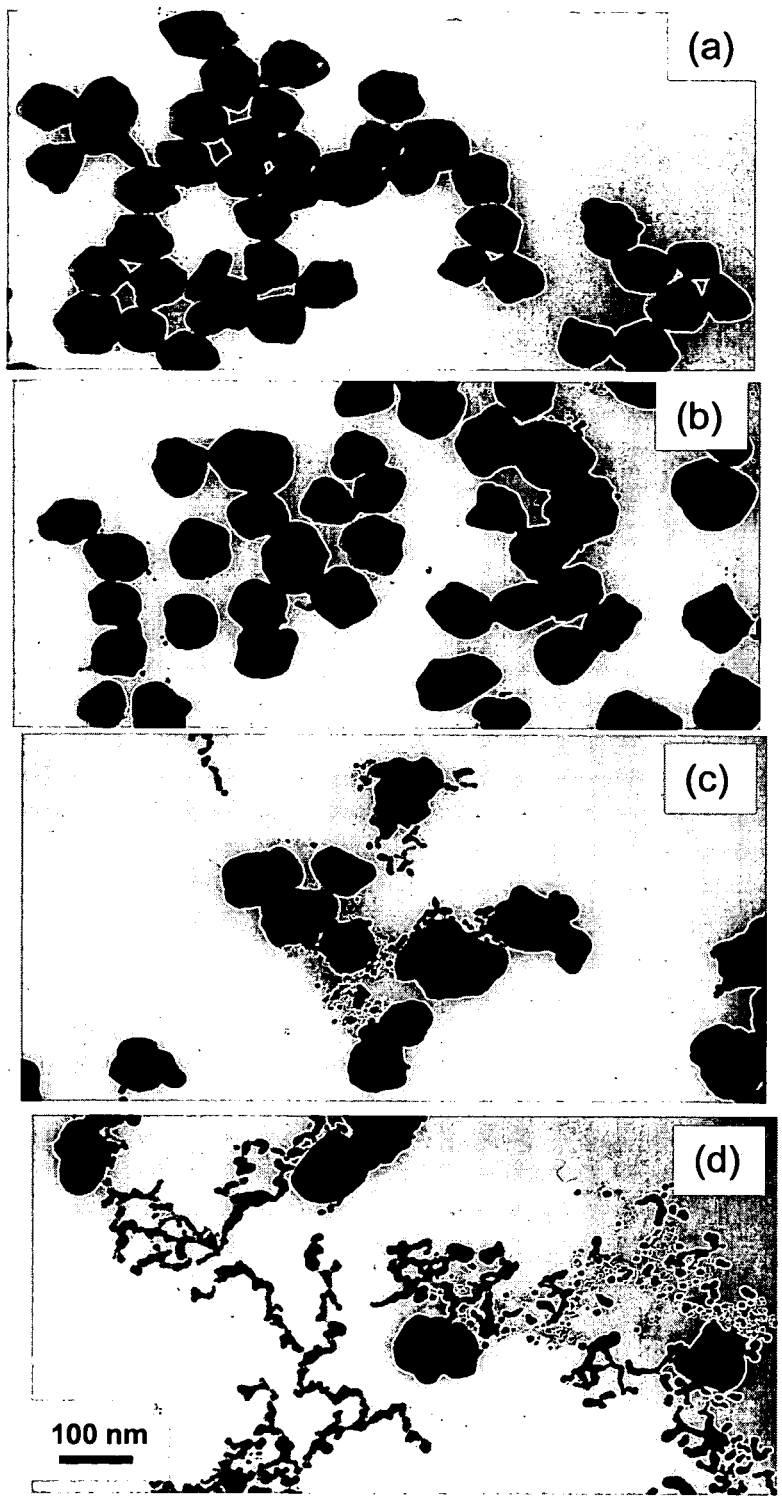
FIG. 14. TEM images of Au colloids networked by Ag whiskers synthesized in 20 wt % $EO_{37}PO_{56}EO_{37}$ formamide solutions at ~100° C. at different $Ag^+$ concentrations added; $Ag^+$ concentration is (a) 0, (by 0.08, (c) 0.14 and (d) 0.20 mM. The scale bar represents 100 nm.
Figure 15:
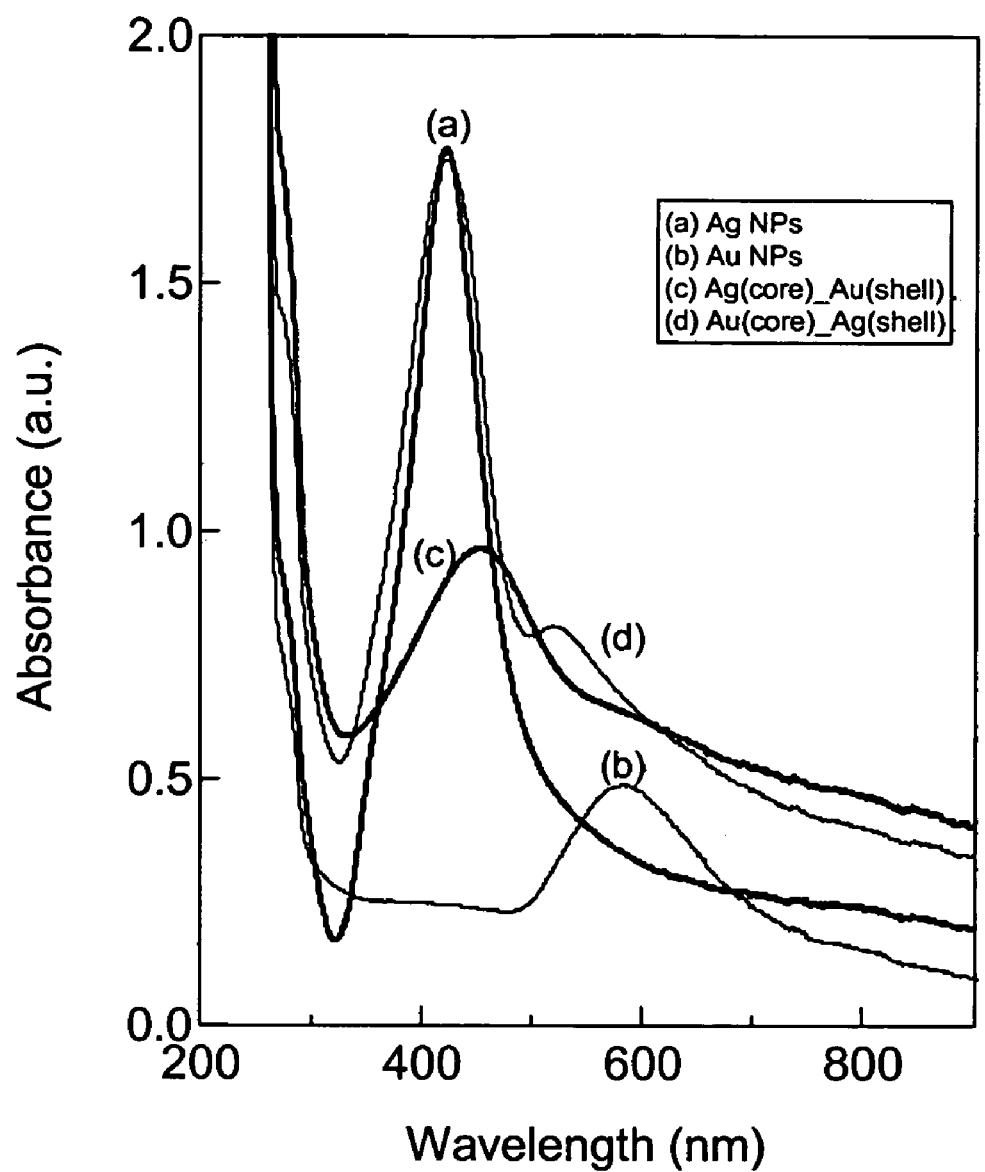
FIG. 15. Absorption spectra of Ag (line (a)) and Au (line (b)) colloids produced in formamide containing 20 wt % $PO_{19}EO_{33}PO_{19}$ block copolymer at ~100° C. for 30 min. Also shown are absorption spectra recorded at 30 min after mixing of a pre-prepared Ag colloid dispersion with $AuCl_4^-$ solution (line (c)) and a pre-prepared Au colloid dispersion with $Ag^+$ solution (line (d)) at ~100° C.
Figure 16:
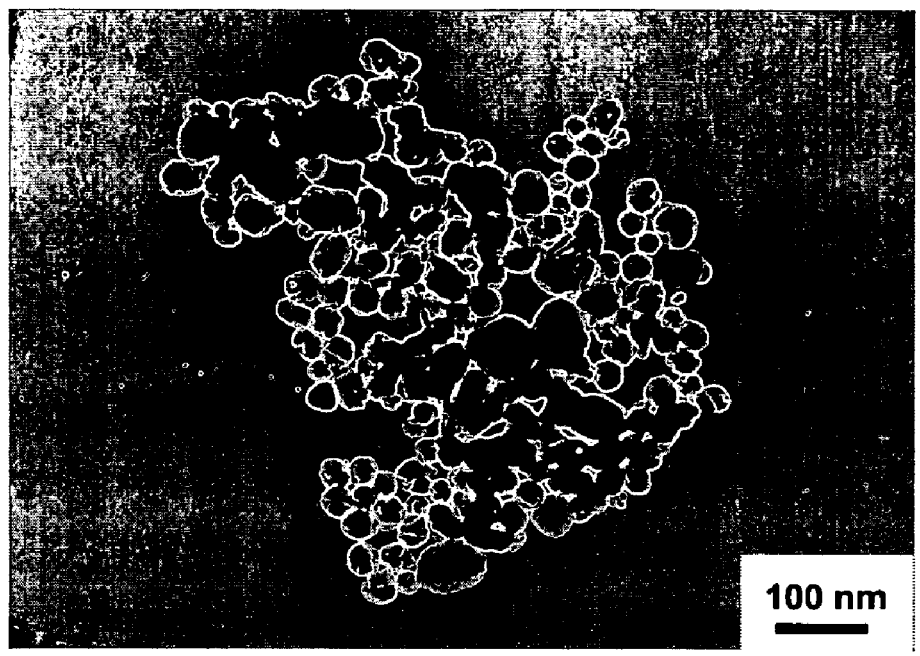
FIG. 16. TEM images of Ag (upper image) and Au (bottom image) colloids produced in formamide containing 10 wt % $PO_{19}EO_{33}PO_{19}$ block copolymer at ~100° C. The scale bar represents 100 nm.
Figure 16:
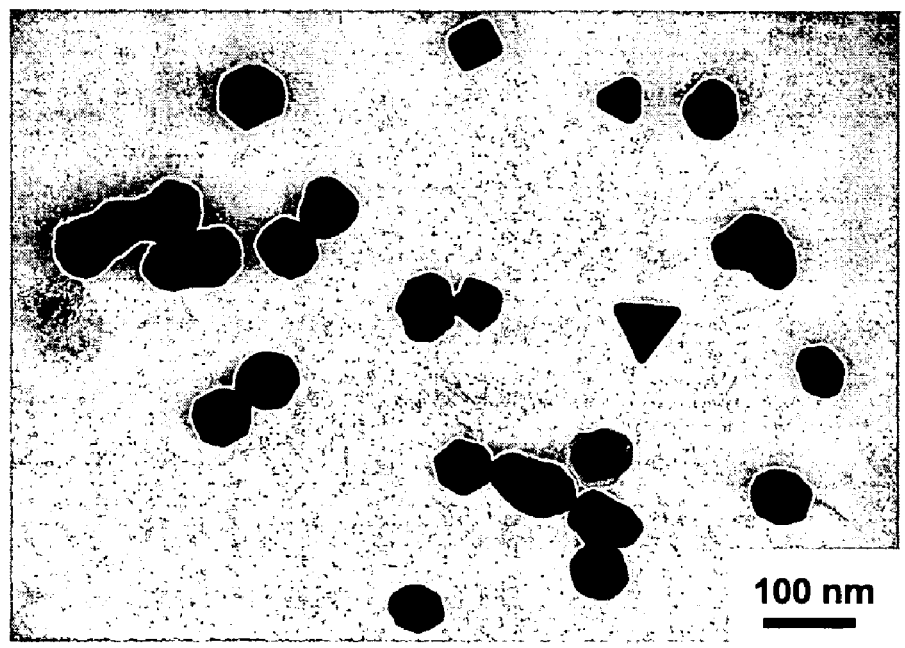
Figure 17:
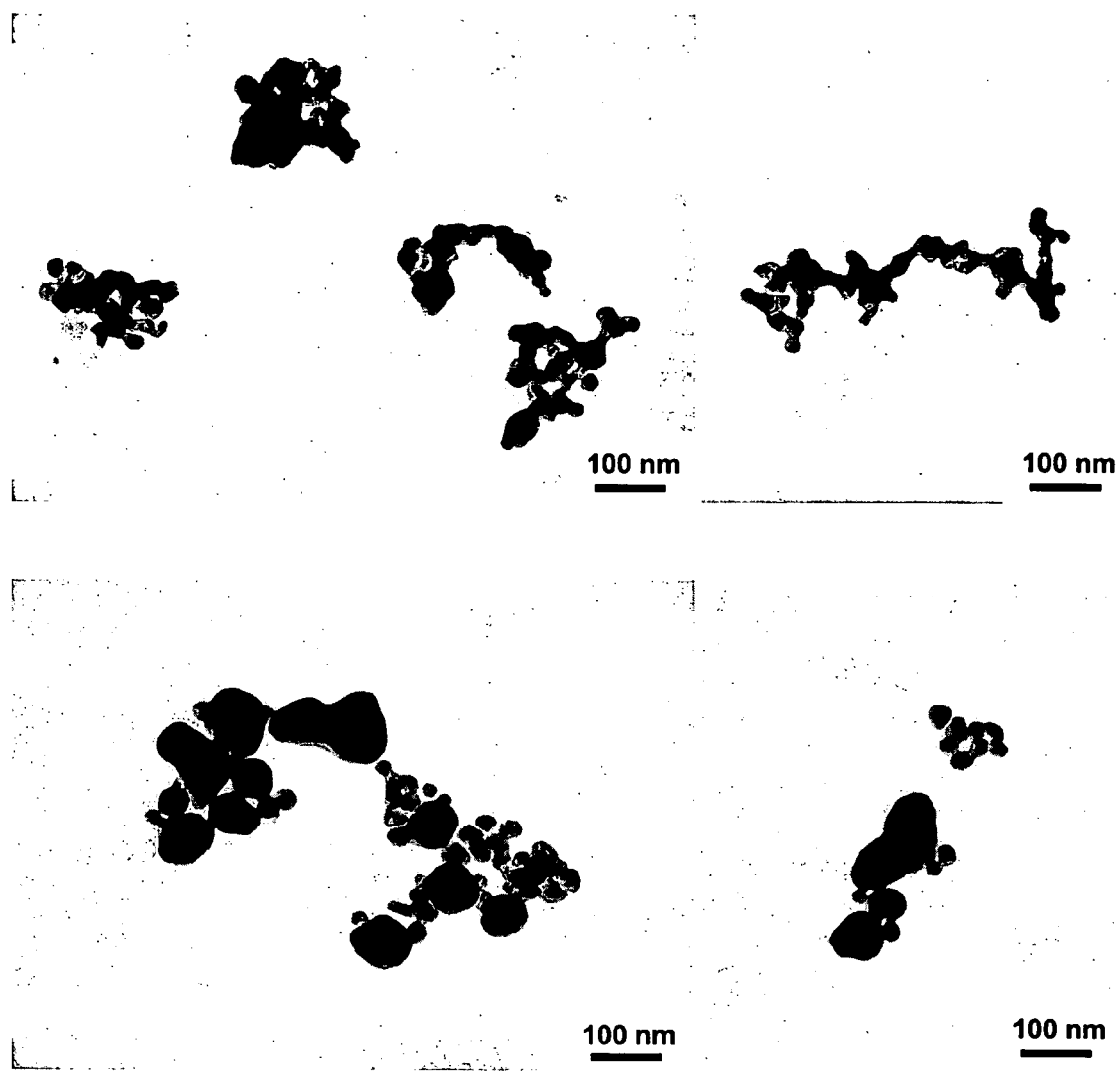
FIG. 17. TEM images of Ag—Au bimetallic colloids produced in formamide containing 10 wt % $PO_{19}EO_{33}PO_{19}$ block copolymer at ~100° C. by mixing of a pre-prepared Ag colloid dispersion with $AuCl_4^-$ solution (upper image) and a pre-prepared Au colloid dispersion with $Ag^+$ solution (bottom image).

In another embodiment, the present invention provides a method for the formation of metal nanowires. At low reducing activity, the particles formed in solution can have a tendency to connect and form wires, especially if colloidal stabilization is low. Thus, if nanowires are desired, the particle formation solution should comprise copolymers of the form $EO_x$-$PO_y EO_x$, where x is in the range of from 1 to 500, y is in the range of from 1 to 300, the average molecular weight is in the range of from 1000 to 20,000 grams per mole and the polymer content is in the range of from 0.1 to 70 wt %. The temperature should be in the range of from 0° C. to 100° C., with higher temperatures in the range tending to favor nanowire formation. Formamide is the preferred solvent, and the preferred metal is silver. In one embodiment, the use of Pluronic P105 gives silver wires with a width of between 200 and 300 nanometers. Example 20 demonstrates the formation of silver wires. FIG. 8 demonstrates the effect of temperature on wire formation. FIG. 9 shows TEM images of silver nanowires and connected particle structures. FIG. 11 and FIG. 12 demonstrate the shape control of silver colloids using various block copolymers (e.g., Pluronic P103, P123, F108 and PEO) in solutions containing formamide. (Examples 12, 13 and 19) FIG. 10 demonstrates that when the solution is aqueous, nanowires are not formed.

In yet another embodiment, the present invention gives a method for the preparation of bimetallic particles which have a core/underlayer of one metal and an overlayer of another metal. Bimetallic particles can be prepared by conducting the particle formation of one metal in the presence of a pre-formed dispersion of another metal. If the particle formation solution conditions are chosen such that metal ion reduction takes place at the surface of existing particles rather than forming new particles, bimetallic particles will form. In one embodiment, PEO-PPO copolymers are used which have number of EO segments in the range of from 1 to 500, number of PO segments in the range of from 1 to 300, an average polymer molecular weight in the range of from 1000 to 20,000 grams per mole, a temperature in the range of from 4 to 100° C., and a metal salt concentration in the range of from $10^{-4}$ to $10^{-2}$ M. In one embodiment, the outer layer of the particle is gold or silver, and the metal ion is $AuCl_4^-$ or $Ag^+$, respectively.

Multi-metallic particles, which comprise a particle of one metal in which another metal is "networked," can also be prepared by the method disclosed herein. In general, at least two different metals are present in solution as ions. The particle formation process incorporates both metals into the particles being formed. The multi-metallic particle synthesis is achieved by addition of the copolymer and/or several metal salts to the particle formation solution. Any one or more of the copolymer and the metal salts can be added directly (as powder) to the particle formation solution simultaneously or sequentially. Alternatively, the polymer and/or salts may be added simultaneously or sequentially in the form of solutions. Metal nanoparticle synthesis is achieved by simply combining the polymer and salts into a single solution, and allowing it to stand until a suspension is formed. Agitation such as, for example, via homogenizer or ultrasonic irradiation, is not required). The formation of multimetallic particles is demonstrated in Examples 21 and 22. See FIGS. 13-17.

In another embodiment, the shape of the particles in the colloidal suspension can be selected by the choice of polymer concentration and temperature. An increase in PEO-PPO block copolymer concentration leads to the predominance of micellar conformations over non-associated polymers (unimers). The copolymer concentration at which micelles form is called critical micelle concentration (cmc). See Table 1 for cmc values in water at 25° C. The cmc is a function of both solvent type and temperature.

Figure 18:
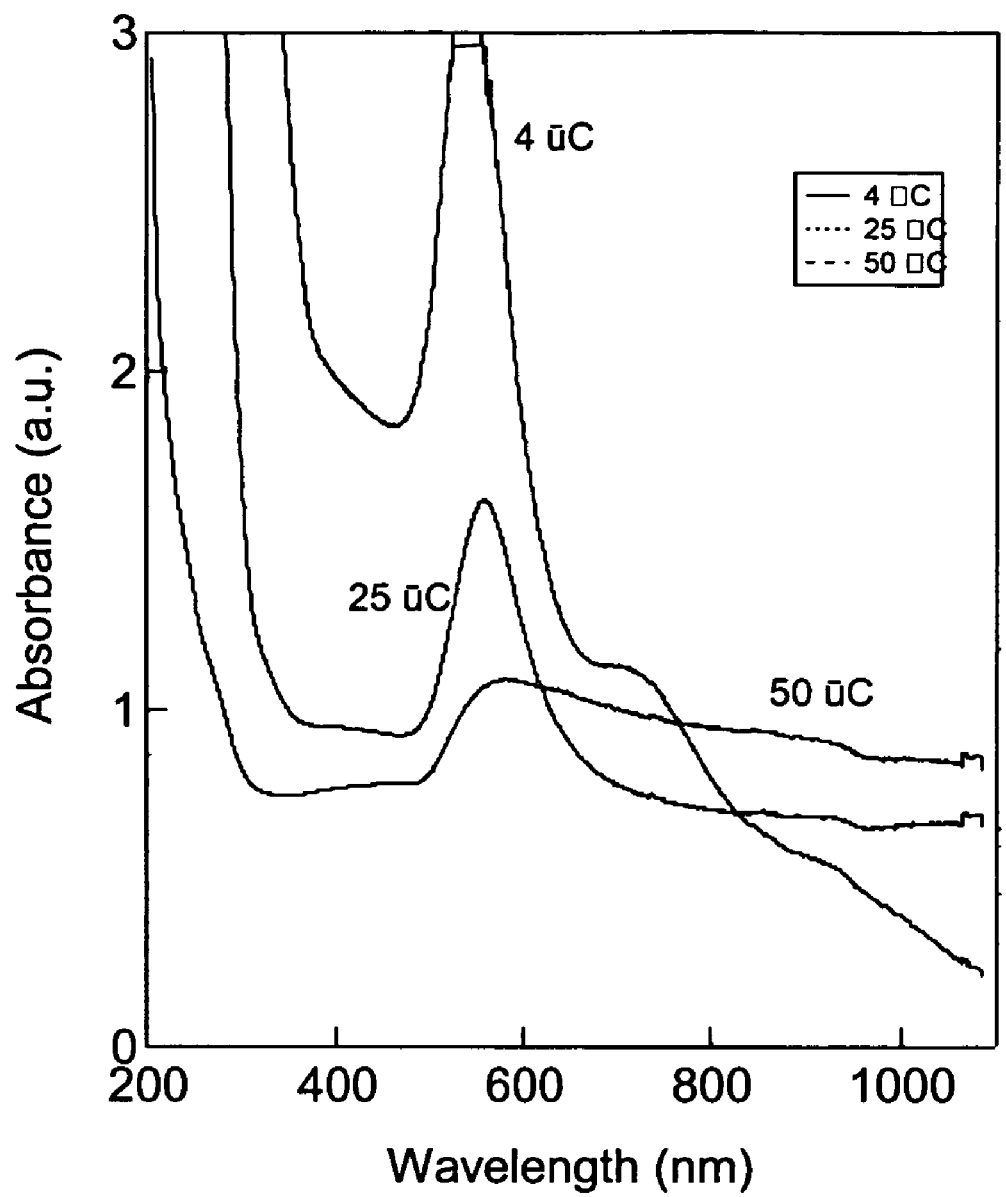
FIG. 18. Absorption spectra recorded at ~1 day after reaction was initiated (mixing of 20 wt % $EO_{100}PO_{65}EO_{100}$ formamide solutions with 2.0 mM $AuCl_4^-$ aqueous solution) at different temperatures: ~4, ~25 and ~50° C.
Figure 19:
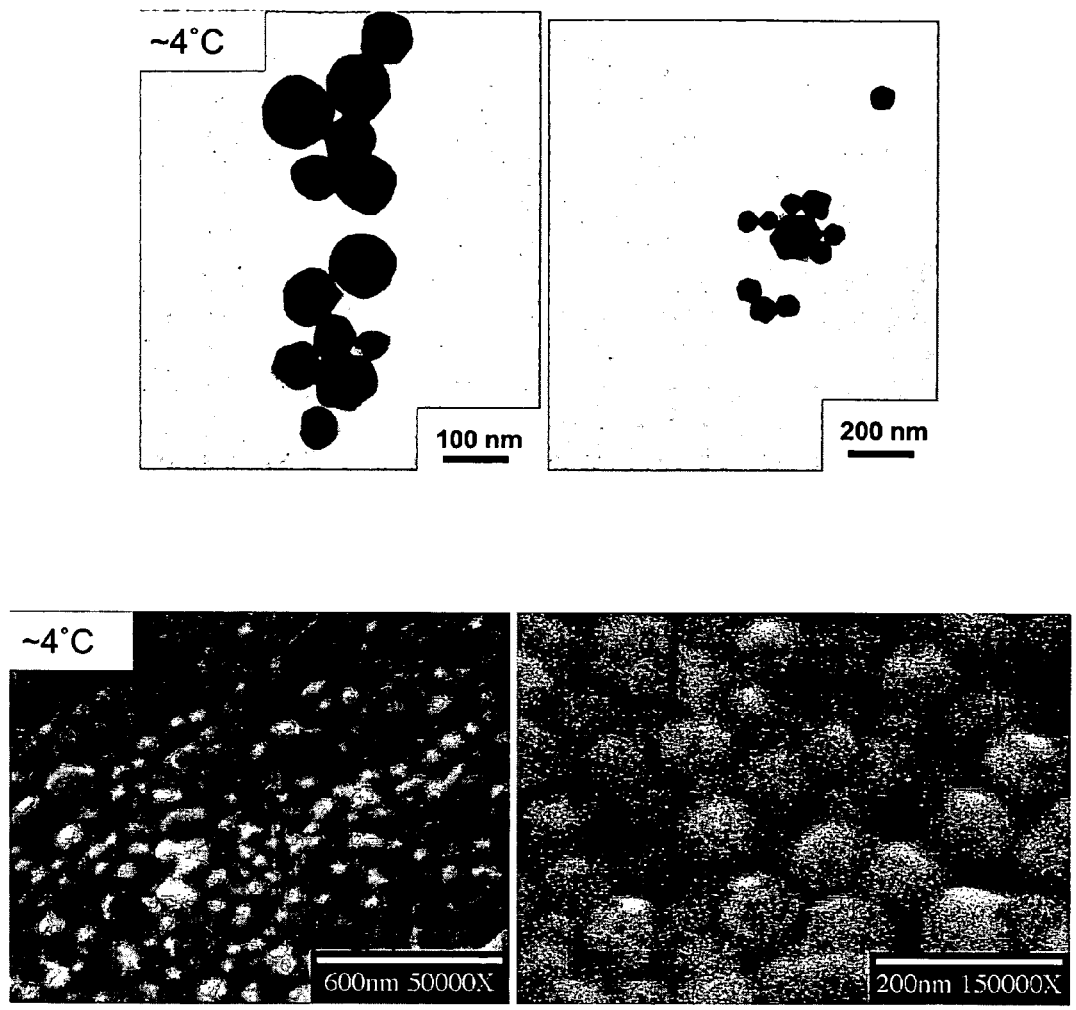
FIG. 19. TEM and SEM images of gold particles synthesized in 20 wt % $EO_{100}PO_{65}EO_{100}$ aqueous solutions at ~4° C. for 1 day.
Figure 20:
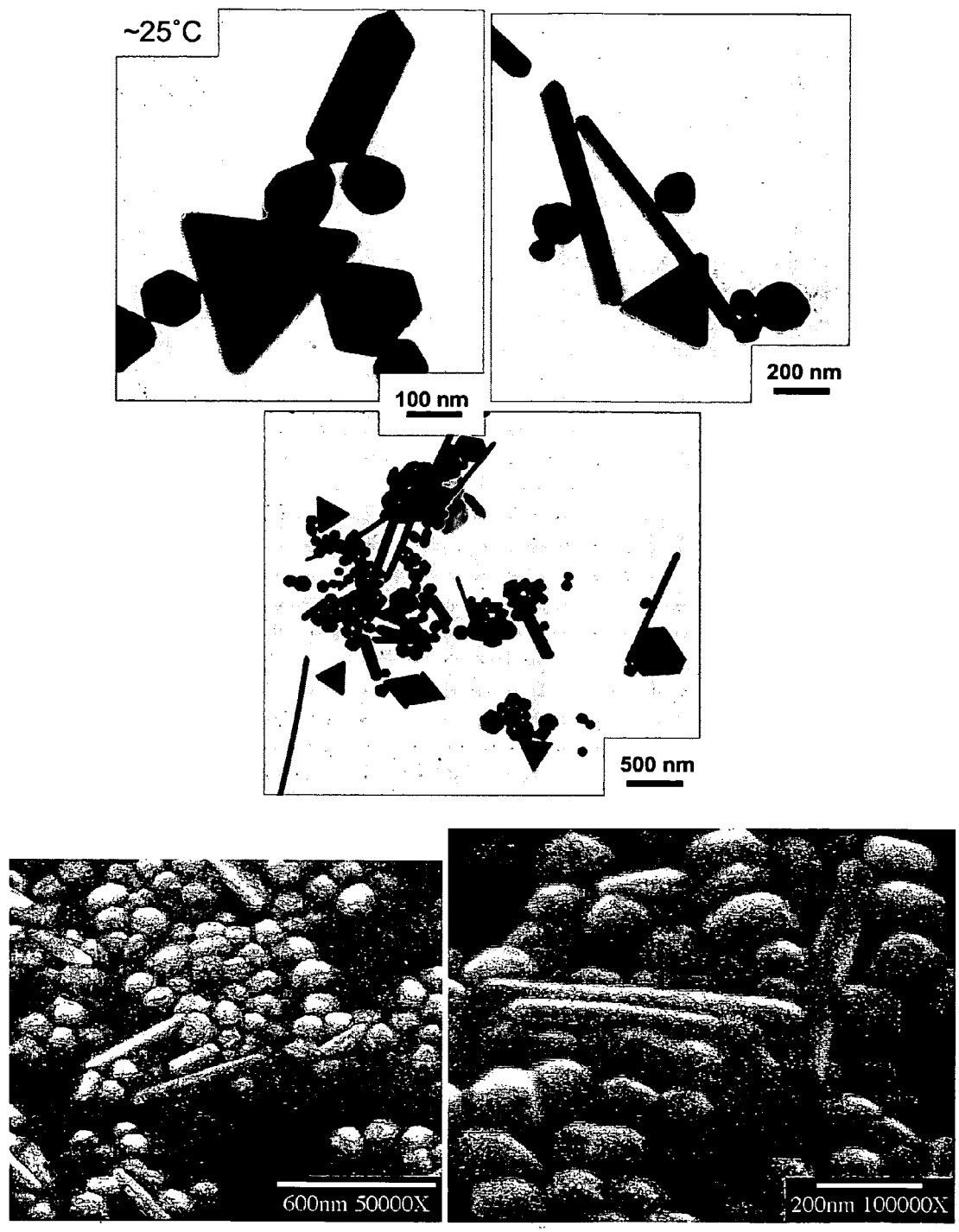
FIG. 20. TEM and SEM images of gold particles synthesized in 20 wt % $EO_{100}PO_{65}EO_{100}$ aqueous solutions at ~25° C. for 1 day.
Figure 21:
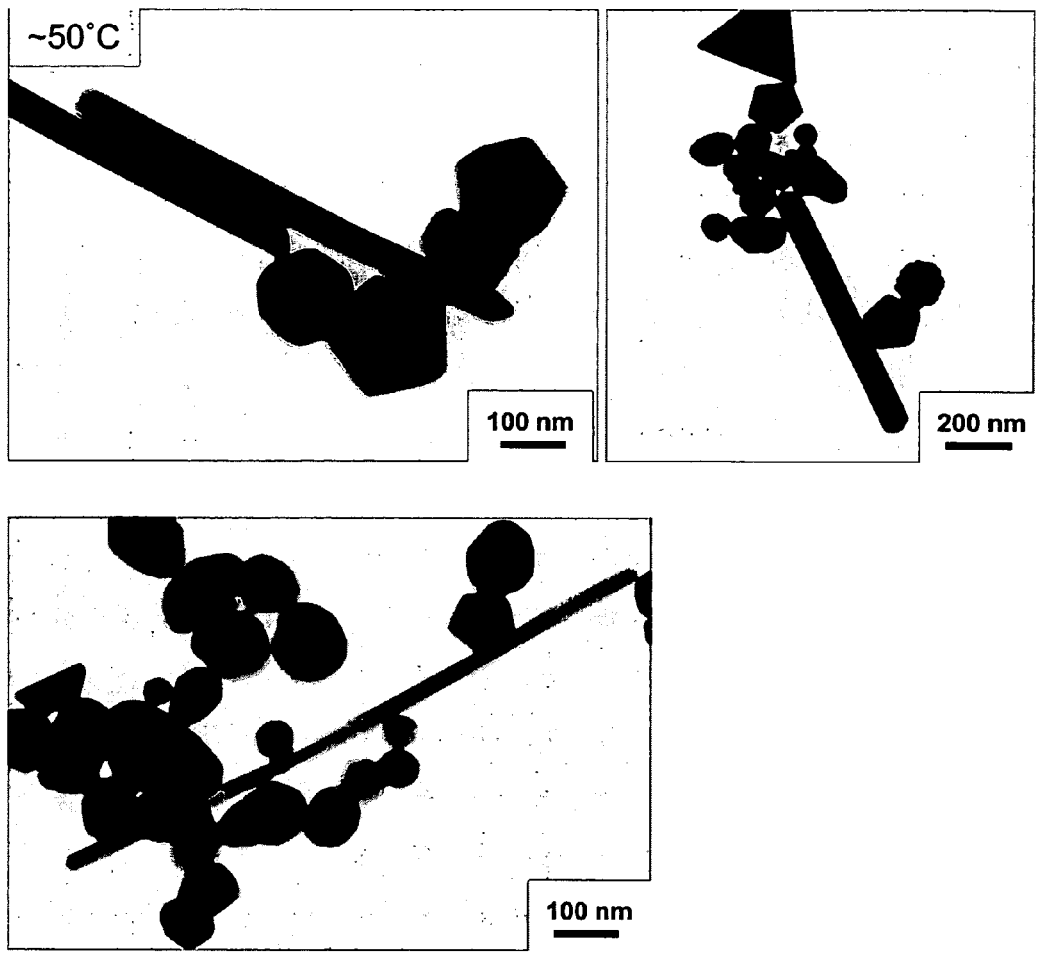
FIG. 21. TEM and SEM images of gold particles synthesized in 20 wt % $EO_{100}PO_{65}EO_{100}$ aqueous solutions at ~50° C. for 1 day.
Figure 22:
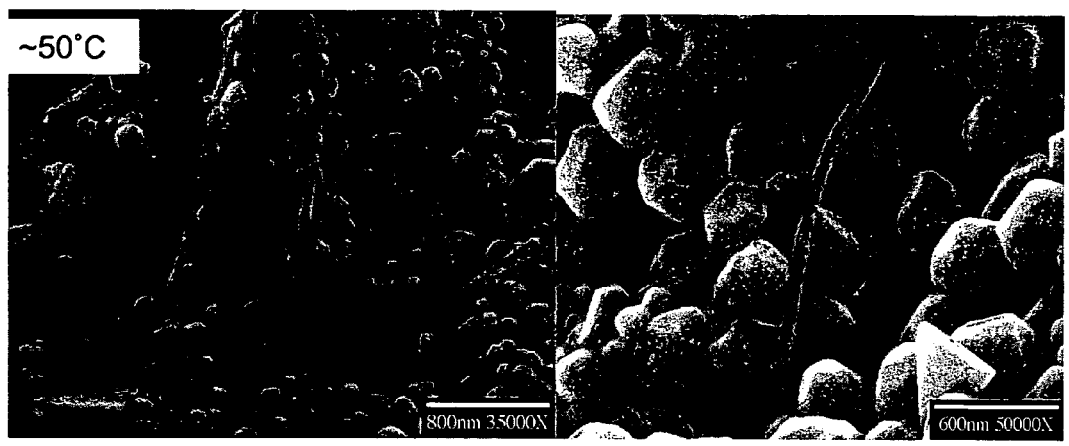
FIG. 22. TEM and SEM images of gold particles synthesized in 20 wt % $EO_{100}PO_{65}EO_{100}$ aqueous solutions at ~50° C. for 1 day.
Figure 23:
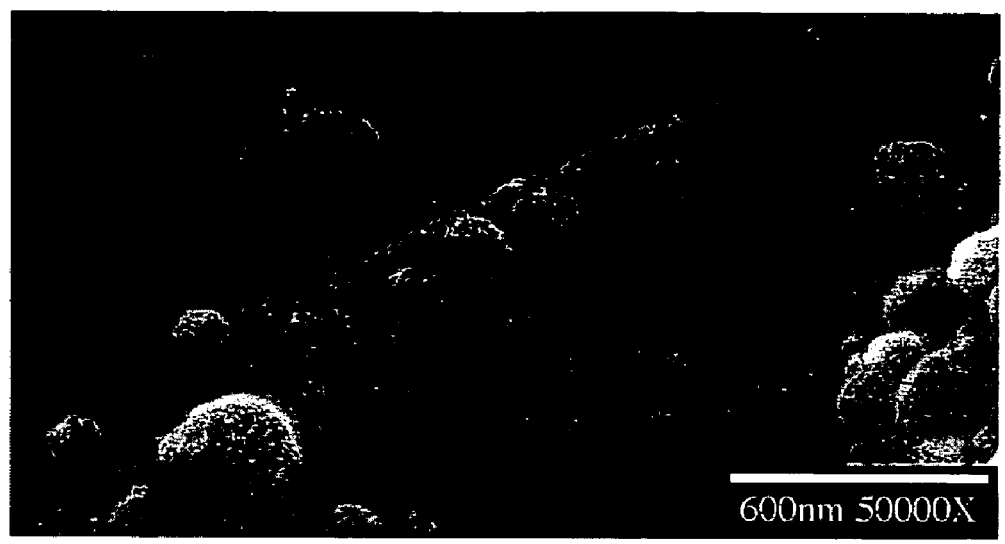
FIG. 23. TEM and SEM images of gold particles synthesized in 20 wt % $EO_{100}PO_{65}EO_{100}$ aqueous solutions at ~50° C. for 1 day.
Figure 24:
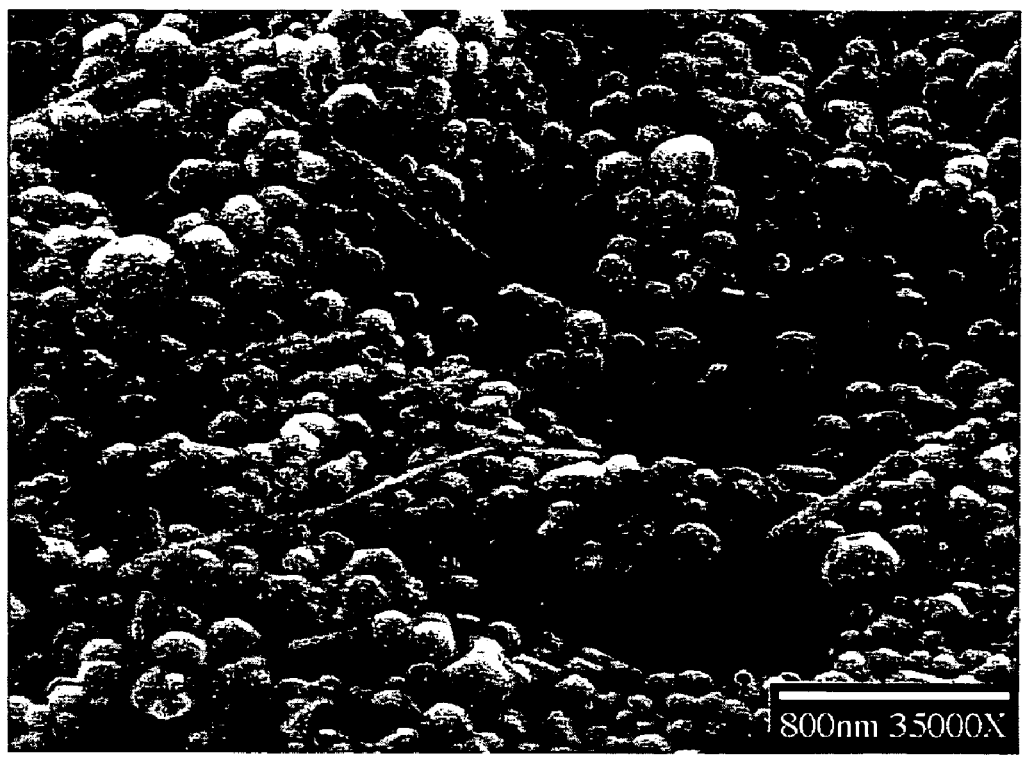
FIG. 24. TEM and SEM images of gold particles synthesized in 20 wt % $EO_{100}PO_{65}EO_{100}$ aqueous solutions at ~50° C. for 1 day.

Without desiring to be bound by theory, it is thought that in polymer formation solutions of different temperatures, different polymer structures predominate. In one embodiment of the present invention, the polymer formation solution has a polymer concentration of from 0.1 to 70 wt % in aqueous solution and comprises PEO blocks in the range of from 1 to 500 EO segments, PPO blocks in the range of from 1 to 300 PO segments, with an average polymer molecular weight in the range of from about 1000 to 20,000. The metal ion is preferably $AuCl_4^-$. At low temperatures, such as in the range of from 0 to 20° C. micellar structures predominate, and spherical polyhedral particles are formed. See FIG. 19. At intermediate temperatures, such as in the range of from 20 to 40° C., at which micellar structures are mixed with lyotropic liquid crystal cubic gel structures, triangular and hexagonal plates are formed in addition to spherical polyhedral particles. See FIG. 20. At relatively high temperatures, such as between 40 and 100° C. The structures formed include plates which have lengthened into rods along the axis perpendicular to the plate, and the incidence of spherical particles drops. See FIGS. 21-23. FIG. 18 provides spectrographic evidence of the different particle shape distributions at 4, 25 and 50° C. See Example 17.

Gold nanoparticles which are synthesized in PEO-PPO-PEO block copolymer solutions can produce spherical, triangular, hexagonal and rod structures or a mixture comprising two or more types. With the inclusion of surfactants in the particle formation solution, the yield of rods as opposed to other types of nanoparticles is increased. Typically, the yield can be increased to as much as 80 weight percent of particles formed. Surfactants which can be used in the particle formation solution preferably have no metal ion reducing capabilities and include alkyltrimethylammonium bromide ($C_n$TAB; n=12-14), sodium alkyl sulfate ($SC_m$S; m=8-14), polyelectrolyte (e.g., poly(sodium 4-styrenesulfonate), polyallylamine hydrochloride), nonionic surfactants (e.g., Brij 92, Brij 97, Brij 72, Tween 80) and other surfactants such as Aerosol-OT. It is preferable to use the surfactant in amounts in the range of from 10 to 70 wt %. The surfactant is preferably present in amounts such that the weight ratio of surfactant in the solution is in the range of from about 10 to 70 wt %. The weight ratio of surfactant to polymer is preferably in the range of from 10 to 80 wt %, and the concentration of metal ion in the solution prior to particle formation is in the range of from $10^{-5}$ to $10^{-1}$ M. The metal salt is preferably a gold or silver salt. The mixture ratio of PEO-PPO-PEO block copolymers and surfactant allows control of the concentration and aspect ratio (the ratio of a rod diameter to length) of rods formed. With increasing proportion of surfactant in PEO-PPO block copolymer particle formation solution, the average aspect ratio of rods formed can be increased. Typically, plates are formed in the solution as well.

In an alternate embodiment, rod structures can be produced from PEO/PPO type amphiphilic block copolymer mixtures which contain at least two different copolymers having different reducing capabilities (i.e., differing PEO/PPO content ratio) in the particle formation solution. In one embodiment, the PEO/PPO type block copolymers with the highest and lowest reducing capability are mixed at various mixing ratio. PEO blocks in the range of from 1 to 500 EO segments, PPO blocks in the range of from 1 to 300 PO segments, an average molecular weight in the range of from 1000 to 20,000 grams per mole, and a block copolymer concentration and block copolymer-mixing ratio in the range of from 0 to 100 wt %. The metal salt is preferably present in the range of from about $10^{-4}$ to $10^{-2}$ M, and is preferably a gold or silver salt.

Example 1

Gold nanoparticles were prepared by mixing a 5.0 mM PEO-PPO-PEO block copolymer selected from Table 1 aqueous or formamide solution (1 ml) and 10.0 mM $AuCl_4^-$ aqueous solution (0.02 ml) at ~25° C. or ~100° C.

Example 2

Silver nanoparticles were prepared by mixing a 10 wt % PEO-PPO-PEO or PPO-PEO-PPO block copolymer (listed in Table 1) formamide solution (1 ml) and 10.0 mM $Ag^+$ aqueous solution (0.02 ml) at ~100° C.

Example 3

This example demonstrates the formation of gold nanoparticles after formation of the particle formation solution. A solution was prepared with the following solution parameters and subjected to mixing. (i) F108 (MW 14600, PEO content 80 wt %, number of EO segments=264, number of PO segments=50), (ii) 5.0 mM (5.0 wt %), (iii) $AuCl_4^-$, (iv) 0.2 mM (v) in water, and (vi) ~25° C. started to form gold particles within 5 min after the reaction was initiated. Time of initiation taken to be the moment mixing began.

Example 4

This example demonstrates the formation of gold nanoparticles after formation of the particle formation solution. A solution was prepared with the following solution parameters and subjected to mixing (i) P103 (MW 4950, PEO content 30 wt %, number of EO segments=34, number of PO segments=60), (ii) 5.0 mM (5.0 wt %), (iii) $AuCl_4^-$, (iv) 0.2 mM (v) in water, and (vi) ~25° C. started to form gold particles at ~10 min after the reaction was initiated. Time of initiation taken to be the moment mixing began.

Example 5

This example demonstrates the control of particle size by control of block copolymer type and concentration. Metallic nanoparticles are formed under conditions in which the reaction activity dominates the effect of colloidal stabilization. The diameter of spherical gold particles increased from 5 to 20 nm with (i) increase in overall chain length of PEO-PPO-PEO block copolymers and/or PEO block length (e.g, P103<P105<F127<F108), (ii) increase in block copolymer concentration (0.4-5.0 mM or 0.6-7.0 wt %), (iii) $AuCl_4^-$, (iv) 0.2 mM (lower metal ion concentration), (v) in water and (vi) ~25° C. (intermediate temperature).

Example 6

This example demonstrates the control of particle size by control of temperature. The diameter of gold particles increased from ~20 to ~40 nm with (i) P105, (ii) 10 wt % (higher block copolymer concentration), (iii) $AuCl_4^-$, (iv) 0.2 mM (lower metal ion concentration), (v) in water and (vi) increase in temperature from ~25 to ~90° C. Heating enhances $AuCl_4^-$ ion reduction on the surface of metal colloids.

Example 7

This example demonstrates a decrease in particle size upon increase in temperature with polymers which do not contain PPO. The diameter of gold particles decreased from 50-200 nm to about 10 nm with (i) PEO homopolymer, (ii) 10 wt % (higher block copolymer concentration), (iii) $AuCl_4^-$, (iv) 0.2 mM (lower metal ion concentration), (v) in water and (vi) increase in temperature from ~25 to ~100° C.

Example 8

This example demonstrates size control by choice of solvent. The diameter of gold particles increased from ~20 nm to ~50 nm with (i) P105, (ii) 10 wt % (higher block copolymer concentration), (iii) $AuCl_4^-$, (iv) 0.2 mM (lower metal ion concentration), (v) change solvent from water to formamide and (vi) ~25° C. (intermediate temperature).

Example 9

This example demonstrates the effect on colloidal stabilization of polymer average molecular weight and concentration. Gold nanoparticles prepared under the conditions of (i) F127 (MW 12600, PEO content 70 wt %, number of EO segments=200, number of PO segments=65), (ii) 5.0 mM (5.0 wt %), (iii) $AuCl_4^-$, (iv) 0.2 mM (v) in water, and (vi) ~25° C. remained in stable dispersion for more than 1 year.

Example 10

This example demonstrates the effect on colloidal stabilization of polymer average molecular weight and concentration. Gold nanoparticles prepared under the conditions of (i) P103 (MW 4950, PEO content 30 wt %, number of EO segments=34, number of PO segments=60), (ii) 0.1 mM (~0.1 wt %), (iii) $AuCl_4^-$, (iv) 0.2 mM (v) in water, and (vi) ~25° C. remained stable for a few weeks after particle formation.

Example 11

This example demonstrates the formation of spherical particles. Spherical Au particles with diameter of 5-20 nm are typically prepared by (i) P103, P105, F127 and F108 (PEO-PPO-PEO block copolymers), (ii) 0.6-20 wt %, (iii) $AuCl_4^-$, (iv) 0.2 mM (lower metal ion concentration), (v) in water and (vi) in the range of 4-90° C.

Example 12

This example demonstrates the formation of spherical particles. Spherical Ag particles (but not be networked) with diameter of ~20 nm (this value is estimated from surface plasmon band) are prepared by (i) P108 (longer overall chain length of PEO-PPO-PEO block copolymers and/or PEO block length), (ii) 10 wt % (higher block copolymer concentration), (iii) $Ag^+$, (iv) 0.2 mM (lower metal ion concentration), (v) in formamide (but not in water) and (vi) ~100° C. (higher temperature).

Example 13

This example demonstrates the formation of spherical and plate-shaped particles. Spherical and plate-like Ag particles (but not be networked) with diameter of 10-100 nm are prepared by (i) P123 (higher PPO content PEO-PPO-PEO block copolymers), (ii) 10 wt % (higher block copolymer concentration), (iii) $Ag^+$, (iv) 0.2 mM (lower metal ion concentration), (v) in formamide (but not in water) and (vi) ~100° C. (higher temperature).

Example 14

This example demonstrates the formation of spherical particles. Spherical Ag particles with diameter of 10-20 nm are prepared by (i) 25R4 (PPO-PEO-PPO block copolymers), (ii) 10 wt % (higher block copolymer concentration), (iii) $Ag^+$, (iv) 0.2 mM (lower metal ion concentration), (v) in formamide (but not in water) and (vi) ~100° C. (higher temperature).

Example 15

This example demonstrates the formation of polyhedral particles. Polyhedral Au particles with diameter of 50-80 nm are formed by (i) P105 (PEO-PPO-PEO block copolymer) and 25R4 (PPO-PEO-PPO block copolymer), (ii) 10 wt % (higher block copolymer concentration), (iii) $AuCl_4^-$, (iv) 0.2 mM (lower metal ion concentration), (v) in formamide and (vi) ~100° C. (higher temperature).

Example 16

This example demonstrates the formation of polyhedral particles. Polyhedral Au particles with diameter of 50-150 nm are formed by (i) F127, (ii) 20 wt % (higher block copolymer concentration), (iii) $AuCl_4^-$, (iv) 2.0 mM (higher metal ion concentration), (v) in water and (vi) ~4° C. (lower temperature).

Example 17

This example demonstrates the formation of polyhedral particles, triangular/hexagonal plates, and rods. Polyhedral Au particles with diameter of 50-150 nm, triangle/hexagonal plates with diameter of 80-500 nm and thickness of 30-40 nm, and rods with length of micrometer and diameter of 20-50 nm are formed by (i) F127, (ii) 20 wt % (higher block copolymer concentration), (iii) $AuCl_4^-$, (iv) 2.0 mM (higher metal ion concentration), (v) in water and (vi) ~25 and ~50° C. (intermediate temperature).

Example 18

This example demonstrates the formation of triangular/hexagonal plates. Triangle/hexagonal Au plates with diameter of 80-500 nm and thickness of 30-40 nm are typically formed by (i) P105, (ii) 5.0 mM (lower block copolymer concentration), (iii) $AuCl_4^-$, (iv) 0.4-0.8 mM (higher metal ion concentration), and (v) in water and (vi) ~25° C. (intermediate temperature).

Example 19

This example demonstrates the formation of irregularly shaped particles. Irregular shape large silver particles with average diameter of 200-300 nm are prepared by (i) PEO homopolymer, (ii) 10 wt % (higher polymer concentration), (iii) $Ag^+$, (iv) 0.2 mM (lower metal ion concentration), (v) in formamide (but not in water) and (vi) ~100° C. (higher temperature).

Example 20

This example demonstrates the formation of silver nanowires and/or networked particles. Ag nanowires and/or networks are prepared by (i) P105, (ii) 10 wt % (higher block copolymer concentration), (iii) $Ag^+$, (iv) 0.2 mM (lower metal ion concentration), (v) in formamide (but not in water) and (vi) ~100° C. (higher temperature).

Example 21

This example demonstrates the formation of silver networked gold particles. Silver-networked gold particles are prepared by sequential addition of $Ag^+$ aqueous solution into pre-prepared gold particle dispersion at ~100° C. The gold particle dispersion was prepared by mixing $AuCl_4^-$ aqueous solution with 20 wt % P105 (PEO-PPO-PEO) formamide solution at ~100° C.

Example 22

This example demonstrates the formation of gold networked silver particles. Gold-networked silver particles are prepared by sequential addition of $AuCl_4^-$ aqueous solution into pre-prepared silver particle dispersion at ~100° C. The silver particle dispersion was prepared by mixing $Ag^+$ aqueous solution with 20 wt % 25R4 (PPO-PEO-PPO) formamide solution at ~100° C.

TABLE 1

Properties of the PEO-PPO Block Copolymers Used in This Study

| Pluronic*[1] | Molecular weight | PEO wt % | PPO block mol. weight | PEO block mol. weight | cmc/mM (25° C.) | Nominal formula |
|---|---|---|---|---|---|---|
| L43 | 1850 | 30 | 1295 | 555 | — | $EO_6PO_{22}EO_6$ |
| L44 | 2200 | 40 | 1320 | 880 | — | $EO_{10}PO_{23}EO_{10}$ |
| L62 | 2500 | 20 | 2000 | 500 | — | $EO_6PO_{34}EO_6$ |
| L64 | 2900 | 40 | 1740 | 1160 | 26.31 | $EO_{13}PO_{30}EO_{13}$ |
| P65 | 3400 | 50 | 1700 | 1700 | 38.22 | $EO_{19}PO_{29}EO_{19}$ |
| F68 | 8400 | 80 | 1680 | 6720 | 320.5 | $EO_{76}PO_{29}EO_{76}$ |
| P84 | 4200 | 40 | 2520 | 1680 | 6.190 | $EO_{19}PO_{43}EO_{19}$ |
| P85 | 4600 | 50 | 2300 | 2300 | 8.695 | $EO_{26}PO_{40}EO_{26}$ |
| F88 | 11400 | 80 | 2280 | 9120 | 11.51 | $EO_{103}PO_{39}EO_{103}$ |
| P103 | 4950 | 30 | 3465 | 1485 | 0.141 | $EO_{17}PO_{60}EO_{17}$ |
| P104 | 5900 | 40 | 3540 | 2360 | 0.508 | $EO_{27}PO_{61}EO_{27}$ |
| P105 | 6500 | 50 | 3250 | 3250 | 0.461 | $EO_{37}PO_{56}EO_{37}$ |
| F108 | 14600 | 80 | 2920 | 11680 | 3.082 | $EO_{132}PO_{50}EO_{132}$ |
| P123 | 5750 | 30 | 4025 | 1725 | 0.052 | $EO_{19}PO_{69}EO_{19}$ |
| F127 | 12600 | 70 | 3780 | 8820 | 0.555 | $EO_{100}PO_{65}EO_{100}$ |
| 25R4 | 3600 | 40 | 2160 | 1440 | >10 wt % | $PO_{19}EO_{33}PO_{19}$ |
| PEO | 6000 | 100 | 0 | 6000 | — | $EO_{136}$ | cmc: critical micelle concentration*[2]

*[1]"Pluronic" is a registered trademark of BASF. Such polymers are available for other suppliers under the generic name "Poloxamers" and a variety of trade names.

*[2]cmc values are obtained by Alexandridis et al. (Alexandridis, P.; Holzwarth, J. F.; Hatton, T. A., "Micellization of Poly(ethylene oxide)-Poly(propylene oxide)-Poly(ethylene oxide) Triblock Copolymers in Aqueous Solutions: Thermodynamics of Copolymer Association". Macromolecules, 1994. 27(9), 2414-2425.).

TABLE 2

Size and shape of metal particles that we obtained

| Metal | Shape | Size | (i) | (ii) | (iii) | (iv) | (v) | (vi) |
|---|---|---|---|---|---|---|---|---|
| Au | Spherical particles | Smaller (5-20 nm) | Shorter | 0.4-5.0 mM | $AuCl_4^-$ | 0.2 mM | Water | ~25° C. |
| | | Larger (5-20 nm) | Longer | 0.4-5.0 mM | $AuCl_4^-$ | 0.2 mM | Water | ~25° C. |
| | | Smaller (5-20 nm) | P103 P105 F127 F108 | Lower (<5.0 mM) | $AuCl_4^-$ | 0.2 mM | Water | ~25° C. |
| | | Larger (5-20 nm) | P103 P105 F127 F108 | Higher (<5.0 mM) | $AuCl_4^-$ | 0.2 mM | Water | ~25° C. |
| | Spherical particles | ~20 nm | P105 | 10 wt % | $AuCl_4^-$ | 0.2 mM | Water | ~25° C. |
| | | ~40 nm | P105 | 10 wt % | $AuCl_4^-$ | 0.2 mM | Water | ~90° C. |
| | Spherical particles | <~10 nm | PEO | 10 wt % | $AuCl_4^-$ | 0.2 mM | Water | ~25° C. |
| | | 50-200 nm | PEO | 10 wt % | $AuCl_4^-$ | 0.2 mM | Water | ~100° C. |
| | Triangle/hexagonal plates | 80-500 nm | P105 | 5.0 mM | $AuCl_4^-$ | 0.4-0.8 mM | Water | ~25° C. |
| | Polyhedral | ~50 nm | P105 | 10 wt % | $AuCl_4^-$ | 0.2 mM | Formamide | ~25° C. |
| | | ~70 nm | P105 | 10 wt % | $AuCl_4^-$ | 0.2 mM | Formamide | ~100° C. |
| | Polyhedral | 60-80 nm | 25R4 | 10 wt % | $AuCl_4^-$ | 0.2 mM | Formamide | ~100° C. |
| | Polyhedral | 50-150 nm | F127 (16 mM) | 20 wt % | $AuCl_4^-$ | 0.2 mM | Water | ~4° C. |

TABLE 2-continued

Size and shape of metal particles that we obtained

| Metal | Shape | Size | (i) | (ii) | (iii) | (iv) | (v) | (vi) |
|---|---|---|---|---|---|---|---|---|
| | Polyhedral, tilangle/hexagonal plates and rods | — | F127 | 20 wt % (16 nM) | $AuCl_4^-$ | 0.2 mM | Water | ~25° C. |
| | Polyhedral, triangle/hexagonal plates and rods | — | F127 | 20 wt % (16 nM) | $AuCl_4^-$ | 0.2 mM | Water | ~100° C. |
| Ag | Nanowires and/or networks | — | P105 | 10 wt % | $Ag^+$ | 0.2 mM | Formamide | ~100° C. |
| | Individual particles | — | Longer (F108 > P105 > P103) | 10 wt % | $Ag^+$ | 0.2 mM | Formamide | ~100° C. |
| | Individual particles and plates | 10-100 nm | P123 | 10 wt % | $Ag^+$ | 0.2 mM | Formamide | ~100° C. |
| | Non-shape | 200-300 nm | PEO | 10 wt % | $Ag^+$ | 0.2 mM | Formamide | ~100° C. |
| | Spherical particles | 10-20 nm | 25R4 | 10 wt % | $Ag^+$ | 0.2 mM | Formamide | ~100° C. |

We claim:

1. A method for producing metal nanoparticles, said method comprising the steps of:
   a) preparing a particle formation solution consisting essentially of a solvent, a first metal ion, a second metal ion, and a copolymer, said copolymer consisting essentially of a first polymer, which consists essentially of poly(ethylene oxide), poly(vinyl alcohol), poly(vinyl pyrrolidone), poly(acrvlic acid), dextran, polysaccharide, gelatin, polyamine, or protein and a second polymer, which consists essentially of poly(propylene oxide), poly(butylene oxide), polydimethylsiloxane, polybutadiene, polystyrene, or polyethylene, wherein the first polymer is characterized as having a greater reducing activity than the second polymer and the second polymer is characterized as having a greater stabilizing activity than the first polymer;
   b) holding the solution from a) at a temperature such that a suspension of metal nanoparticles is formed in said particle formation solution;
   wherein nanoparticles comprising networks of the first metal inside the second metal are formed in step b); and
   wherein the first metal is silver and the second metal is gold; or wherein the first metal is gold and the second metal is silver.

2. The method of claim 1 wherein the first polymer is poly(ethylene oxide), the second polymer is poly(propylene oxide), the weight ratio of the poly(ethylene oxide) to the poly(propylene oxide) is in the range of from about 1 to 99 (wt %), and the copolymer has an average molecular weight in the range of from 1000 to 50,000 grams per mole.

3. The method of claim 1, wherein the copolymer is in the form of a block copolymer, graft copolymer, dendrimer copolymer, random copolymer or star copolymer.

4. The method of claim 1 wherein the solvent is selected from the group consisting of water, methanol, ethanol, propanol, formamide, N,N-dimethylformamide, ethyl acetate, glycerol, ethylene glycols, acetaldehyde, acetone, tetrahydrofuran, 1-butanol, 1-ethyl-3-methylimidazolium chloride, 1-ethyl-3-methylimidazolium bromide, 1-ethyl-3-methylimidazolium iodide, 1-ethyl-3-methylimidazolium trifluoromethanesulfonate, 1-ethyl-3-methylimidazolium tetrafluoroborate, 1-ethyl-3-methylimidazolium hexafluorophoshate, 1-n-butyl-3-methylimidazolium chloride, and 1-n-butylpyridinium hexafluorophoshate.

5. The method of claim 4 wherein the concentration of the first or second metal ion in step a) is in the range of from $10^{-5}$ to $10^{-1}$ M, the copolymer concentration is in the range of from 1 to 99 wt %, and the temperature is in the range of from 0° C. to 100° C.

6. The method of claim 1 wherein at least $10^{-3}$ wt % spherical, polyhedral, polygonal or wire-shaped nanoparticles are formed.

* * * * *